US009671905B2

(12) United States Patent
Noguchi et al.

(10) Patent No.: US 9,671,905 B2
(45) Date of Patent: Jun. 6, 2017

(54) DISPLAY DEVICE WITH TOUCH DETECTION FUNCTION, CONTROL CIRCUIT, DRIVING METHOD OF DISPLAY DEVICE WITH TOUCH DETECTION FUNCTION, AND ELECTRONIC UNIT

(75) Inventors: Koji Noguchi, Kanagawa (JP);
Yoshitoshi Kida, Kanagawa (JP);
Kohei Azumi, Tokyo (JP)

(73) Assignee: Japan Display Inc., Tokyo (JP)

( * ) Notice: Subject to any disclaimer, the term of this patent is extended or adjusted under 35 U.S.C. 154(b) by 492 days.

(21) Appl. No.: 13/067,658

(22) Filed: Jun. 17, 2011

(65) Prior Publication Data

US 2012/0050217 A1    Mar. 1, 2012

(30) Foreign Application Priority Data

Aug. 24, 2010   (JP) .................................. 2010-187221

(51) Int. Cl.
| | | |
|---|---|---|
| *G06F 3/045* | (2006.01) | |
| *G06F 3/044* | (2006.01) | |
| *G06F 3/041* | (2006.01) | |

(52) U.S. Cl.
CPC ............ *G06F 3/044* (2013.01); *G06F 3/0412* (2013.01); *G06F 3/0416* (2013.01); *G06F 2203/04108* (2013.01)

(58) Field of Classification Search
CPC ........ G06F 3/0412; G06F 3/044; G06F 3/041; G06F 3/0418; G06F 1/1626;
(Continued)

(56) References Cited

U.S. PATENT DOCUMENTS 5,392,058 A * 2/1995 Tagawa ......................... 345/104
5,448,024 A * 9/1995 Kawaguchi et al. ...... 178/18.07
(Continued)

FOREIGN PATENT DOCUMENTS

| JP | 2003-066417 A | 3/2003 |
| JP | 2008-165434 A | 7/2008 |

(Continued)

OTHER PUBLICATIONS

Japanese Office Action issued Jul. 1, 2014 for corresponding Japanese Application No. 2010-187221.
(Continued)

*Primary Examiner* — Carolyn R Edwards
*Assistant Examiner* — Krishna Neupane
(74) *Attorney, Agent, or Firm* — Michael Best & Friedrich LLP

(57) ABSTRACT

A display device with a touch detection function includes, a plurality of display elements performing display operation based on a pixel signal and a display drive signal, a touch detection element detecting an external proximity object based on a touch detection drive signal, a scan drive section performing display scanning by sequentially supplying the pixel signal and the display drive signal to the plurality of display elements in a time-divisional manner, and the scan drive section supplying the touch detection drive signal to the touch detection element, and a touch detection circuit performing touch detection by sampling a detection result from the touch detection element with a period shorter than a period of the display scanning. The scan drive section supplies the touch detection drive signal to the touch detection element in a touch detection operation period different from a display operation period for performing the display scanning.

16 Claims, 19 Drawing Sheets

(58) Field of Classification Search
CPC .................. G06F 1/1643; G06F 1/169; G06F 2203/04108; G06F 2203/04112; G06F 3/0416; G06F 3/0488
USPC .......................... 345/104, 173–179, 87–100
See application file for complete search history.

(56) References Cited

U.S. PATENT DOCUMENTS

| | | | |
|---|---|---|---|
| 5,534,892 A * | 7/1996 | Tagawa | 345/174 |
| 6,239,788 B1 * | 5/2001 | Nohno et al. | 345/173 |
| 2004/0080480 A1 | 4/2004 | Zhang et al. | |
| 2009/0256818 A1 * | 10/2009 | Noguchi et al. | 345/174 |
| 2010/0182273 A1 | 7/2010 | Noguchi et al. | |
| 2010/0194697 A1 * | 8/2010 | Hotelling et al. | 345/173 |
| 2010/0328239 A1 * | 12/2010 | Harada | G06F 3/0412 345/173 |
| 2011/0134076 A1 * | 6/2011 | Kida | G06F 3/0412 345/174 |
| 2011/0210939 A1 | 9/2011 | Reynolds et al. | |

FOREIGN PATENT DOCUMENTS

| | | |
|---|---|---|
| JP | 2009-244958 | 10/2009 |
| JP | 2013-521548 A | 6/2013 |
| KR | 2000-0028564 A | 5/2000 |
| WO | WO-2011/106575 A2 | 9/2011 |

OTHER PUBLICATIONS

Japanese Office Action issued Dec. 3, 2013 for corresponding Japanese Application No. 2010-187221.
Korean Office Action issued Feb. 20, 2017 for corresponding Korean Patent Application No. 10-2011-0079905.

* cited by examiner

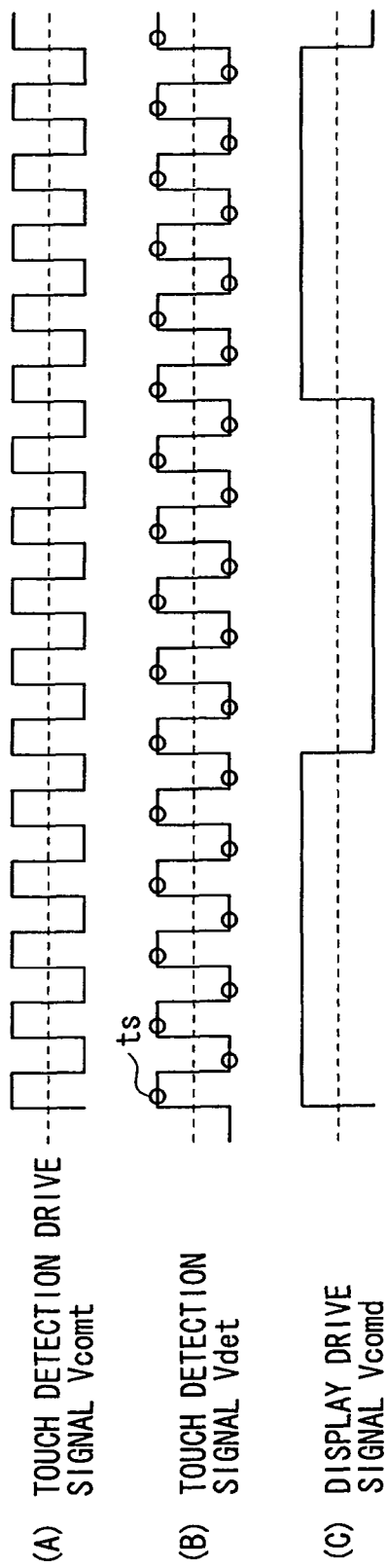

DISPLAY DEVICE WITH TOUCH DETECTION FUNCTION, CONTROL CIRCUIT, DRIVING METHOD OF DISPLAY DEVICE WITH TOUCH DETECTION FUNCTION, AND ELECTRONIC UNIT

BACKGROUND

This disclosure relates to a display device capable of detecting an external proximity object, and in particular, to a display device with a touch detection function detecting touch events based on a change of an electrostatic capacitance, a control circuit, a driving method, and an electronic unit including the same.

In recent years, a display device capable of inputting information by mounting a contact detection device, which is a so-called touch panel, on a display device such as a liquid crystal display device, or integrating the touch panel and the display device, and displaying various button images and the like on the display device instead of typical mechanical buttons has attracted attention. The display device including such a touch panel does not require input devices such as a keyboard, a mouse, and a keypad, and therefore there is a tendency to expand the use of such a display device to portable information terminals such as mobile phones, in addition to computers.

As a method used in a touch detection device, some methods such as optical method and a resistance method exist. Particularly, for mobile terminals or the like, an electrostatic capacitance type touch detection device is expected which has a relatively simple configuration and is capable of achieving low power consumption. For example, in Japanese Unexamined Patent Application Publication No. 2009-244958, a display device in which a common electrode which is for display and is arranged originally for each display device is also used as one electrode of a pair of touch sensor electrodes, and the other electrode (touch detection electrode) is arranged to intersect the common electrode has been proposed. An electrostatic capacitance is formed between the common electrode and the touch detection electrode, and the electrostatic capacitance is changed in response to an external proximity object. The display device uses the change of the electrostatic capacitance to analyze a touch detection signal which appears in the touch detection electrode in response to application of touch detection drive signal to the common electrode, and detects the external proximity object. In the display device, display operation is performed by sequentially applying a drive signal to the common electrode to perform line-sequential scanning, and according to the drive signal, touch detection operation is performed by analyzing the touch detection signal which appears in the touch detection electrode with the period of the display scanning.

SUMMARY

From the viewpoints of operation stability and touch detection sensitivity, the touch detection device is desirably hardly affected by noise. However, as for the electrostatic capacitance type touch detection device, a human body acts as an antenna for noise caused by an inverter fluorescent lamp, AM wave, AC power source, and the like, and the noise probably propagates to the touch detection device. In addition, in a case where a touch detection function is incorporated in a display device, or in a case where a touch detection device is mounted on a display device, various kinds of drive signals used in the display device may be transmitted as noise (hereinafter, referred to as internal noise) to the touch detection device.

It is desirable to provide a display device with a touch detection function capable of performing touch detection while suppressing influence of noise, a control circuit, a driving method of a display device with a touch detection function, and an electronic unit.

A display device with a touch detection function according to an embodiment of the disclosure includes a plurality of display elements, a touch detection element, a scan drive section, and a touch detection circuit. The plurality of display elements each performs display operation based on a pixel signal and a display drive signal. The touch detection element detects an external proximity object based on a touch detection drive signal. The scan drive section performs display scanning by sequentially supplying the pixel signal and the display drive signal to the plurality of display elements in a time-divisional manner, and supplies the touch detection drive signal to the touch detection element. The touch detection circuit performs touch detection by sampling a detection result from the touch detection element with a period shorter than a period of the display scanning. The scan drive section supplies the touch detection drive signal to the touch detection element in a touch detection operation period different from a display operation period for performing the display scanning.

A control circuit according to an embodiment of the disclosure includes a scan drive section and a touch detection circuit. The scan drive section performs display scanning by sequentially supplying a pixel signal and a display drive signal to a plurality of display elements in a time-divisional manner, and supplies a touch detection drive signal to a touch detection element detecting an external proximity object. The touch detection circuit performs touch detection by sampling a detection result from the touch detection element with a period shorter than a period of the display scanning. The scan drive section supplies the touch detection drive signal to the touch detection element in a touch detection operation period different from a display operation period for performing the display scanning.

A driving method of a display device with a touch detection function according to an embodiment of the disclosure includes, performing display scanning by sequentially supplying a pixel signal and a display drive signal to a plurality of display elements in a display operation period, supplying a touch detection drive signal to a touch detection element for detecting an external proximity object in a touch detection operation period different from a display operation period, and driving the display device with a touch detection function to perform touch detection by sampling a detection result from the touch detection element with a period shorter than a period of the display scanning.

An electronic unit according to an embodiment of the disclosure includes the above-described display device with a touch detection function, and corresponds to, for example, a television, a digital camera, a personal computer, a video camera, and a portable terminal device such as a mobile phone.

In the display device with a touch detection function, the control circuit, the driving method of a display device with a touch detection function, and the electronic unit according to the embodiments of the disclosure, the touch detection operation is performed in the touch detection operation period different from the display operation period. At this time, the detection result of the touch detection element is sampled with a period shorter than the period of the display scanning, and therefore the touch detection is performed.

In the display device with a touch detection function according to the embodiment of the disclosure, for example, the display drive signal may be a rectangular wave signal. In addition, for example, the touch detection operation period may correspond to a blanking period of the display scanning. Alternatively, for example, the display operation period may be divided into plural periods by interrupting the display scanning, and the touch detection operation period may be provided within a period in which the display scanning is interrupted. The touch detection drive signal is, for example, a rectangular wave signal with a frequency higher than that of the display drive signal, and the touch detection circuit may sample the detection result from the touch detection element at timings in synchronization with the touch detection drive signal. Moreover, for example, the touch detection drive signal may be a rectangular wave signal with the same frequency as that of the display drive signal. The touch detection element may detect the external proximity object with use of a change of an electrostatic capacitance in response to proximity or contact of the external proximity object.

Furthermore, in the display device with a touch detection function according to the embodiment of the disclosure, for example, common drive electrodes are arranged in parallel to extend in one direction, and the scan drive section may apply the common drive electrodes with the display drive signal in the display operation period, and with the touch detection drive signal in the touch detection operation period. In this case, for example, the touch detection element may detect the external proximity object based also on the display drive signal, and the touch detection circuit may perform the touch detection by sampling the detection result at timings in synchronization with the display drive signal also in the display operation period. The touch detection circuit may switch and perform touch detection in the touch detection operation period and touch detection in the display operation period.

According to the display device with a touch detection function, the control circuit, the driving method of the display device with a touch detection function, and the electronic unit of the embodiments of the disclosure, in the touch detection operation period different from the display operation period, the touch detection is performed by sampling the detection result from the touch detection element with a period shorter than the period of the display scanning, thereby performing touch detection while suppressing influence of noise.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 11 is a timing waveform chart illustrating an operation example in the touch detection operation period of the display device with a touch detection function according to the first embodiment.

FIG. 25 is a sectional view illustrating a schematic cross-sectional configuration of the display section with a touch detection function according to the modification of each of the embodiments and the like.

DETAILED DESCRIPTION

Hereinafter, preferred embodiments of the disclosure will be described in detail with reference to drawings. Note that the description will be given in the following order.
1. Basic principle of electrostatic capacitance type touch detection
2. First embodiment
3. Second embodiment
4. Third embodiment
5. Application examples
1. Basic Principle of Electrostatic Capacitance Type Touch Detection First, a basic principle of touch detection in a display device with a touch detection function according to embodiments of the disclosure will be described with reference to FIG. 1 to FIG. 3. The touch detection method is implemented as an electrostatic capacitance type touch sensor, and a capacitance element is configured with use of a pair of electrodes (a drive electrode E1 and a touch detection electrode E2) facing to each other with a dielectric body D in between as illustrated in (A) of FIG. 1. The configuration is represented as an equivalent circuit illustrated in (B) of FIG. 1. A capacitance element C1 is configured of the drive electrode E1, the touch detection electrode E2, and the dielectric body D. One end of the capacitance element C1 is connected to an alternating signal source (a drive signal source) S, and the other end P is grounded through a resistor R and is connected to a voltage detector (a touch detection circuit) DET. When an alternating rectangular wave Sg ((B) of FIG. 3) with a predetermined frequency (for example, several kHz to several hundreds kHz) is applied to the drive electrode E1 (one end of the capacitance element C1) from the alternating signal source S, an output waveform (a touch detection signal Vdet) illustrated in (A) of FIG. 3 appears in the touch detection electrode E2 (the other end P of the capacitance element C1). Note that the alternating rectangular wave Sg corresponds to a touch detection drive signal Vcomt described later.

Figure 1:
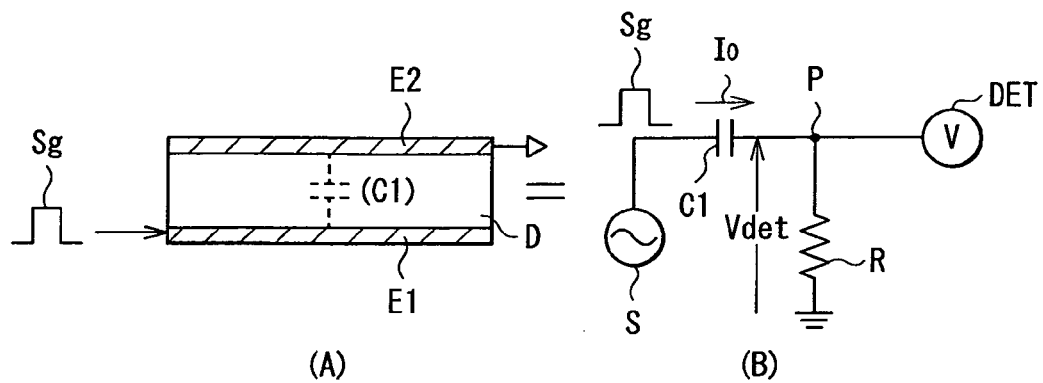
FIG. 1 is a diagram for explaining a basic principle of a touch detection method in a display device with a touch detection function according to embodiments of the disclosure, and a diagram illustrating a state where a finger is not in contact with or not in proximity to the display device.

In a state where a finger is not in contact with (or not in proximity to) the display device, as illustrated in FIG. 1, a current I0 according to the capacitance value of the capacitance element C1 flows in response to charge and discharge with respect to the capacitance element C1. The other end P of the capacitance element C1 at this time has a potential waveform like a waveform V0 in (A) of FIG. 3, and the waveform is detected by the voltage detector DET.

Figure 2:
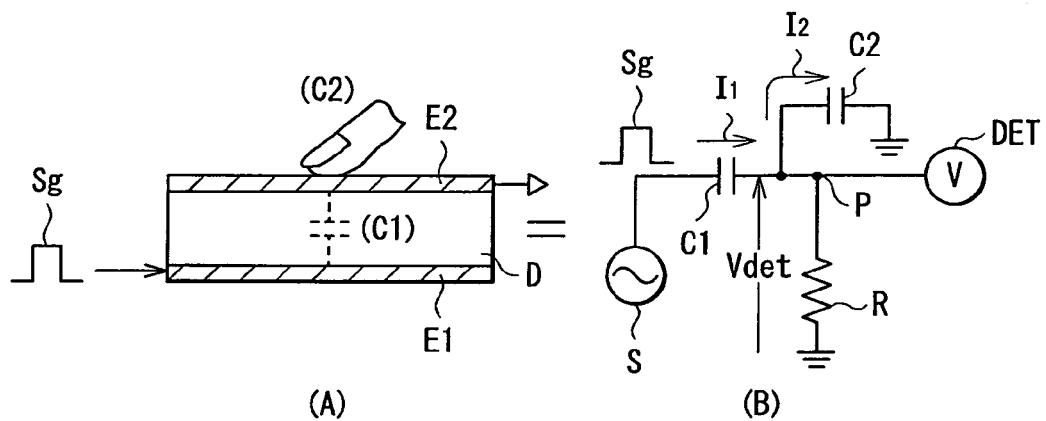
FIG. 2 is a diagram for explaining the basic principle of the touch detection method in the display device with a touch detection function according to the embodiments of the disclosure, and a diagram illustrating a state where a finger is in contact with or in proximity to the display device.
Figure 3:
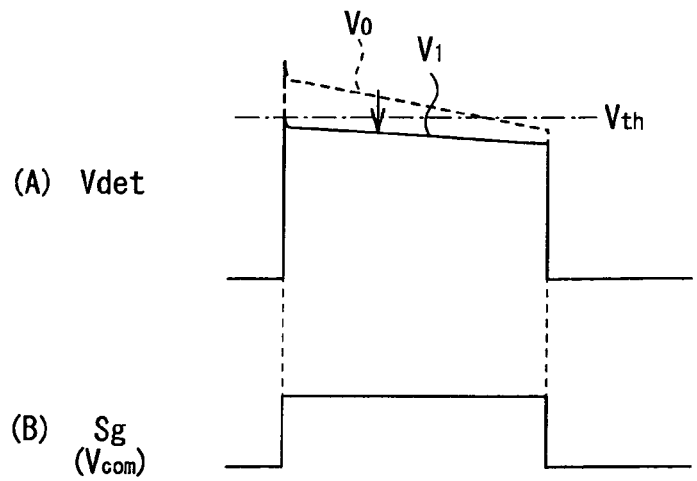
FIG. 3 is a diagram for explaining the basic principle of the touch detection method in the display device with a touch detection function according to the embodiments of the disclosure, and a diagram illustrating an example of a waveform of a drive signal and a touch detection signal.

On the other hand, in a state where a finger is in contact with (or in proximity to) the display device, as illustrated in FIG. 2, a capacitance element C2 formed by the finger is added in series with the capacitance element C1. In this state, currents I1 and I2 flow in response to charge and discharge with respect to the capacitance elements C1 and C2, respectively. The other end P of the capacitance element C1 has a potential waveform like a waveform V1 in (A) of FIG. 3, and the waveform is detected by the voltage detector DET. At this time, the potential of the point P is a partial potential determined by values of the currents I1 and I2 flowing through the capacitance elements C1 and C2. Therefore, the waveform V1 is a smaller value than that of the waveform V0 in a non-contact state. The voltage detector DET compares the detected voltage with a predetermined threshold voltage Vth to determine the non-contact state when the detected voltage is equal to or larger than the threshold voltage, and to determine a contact state when the detected voltage is smaller than the threshold voltage. In such a way, touch detection is achievable.

2. First Embodiment

[Configuration Example]
(General Configuration Example)

Figure 4:
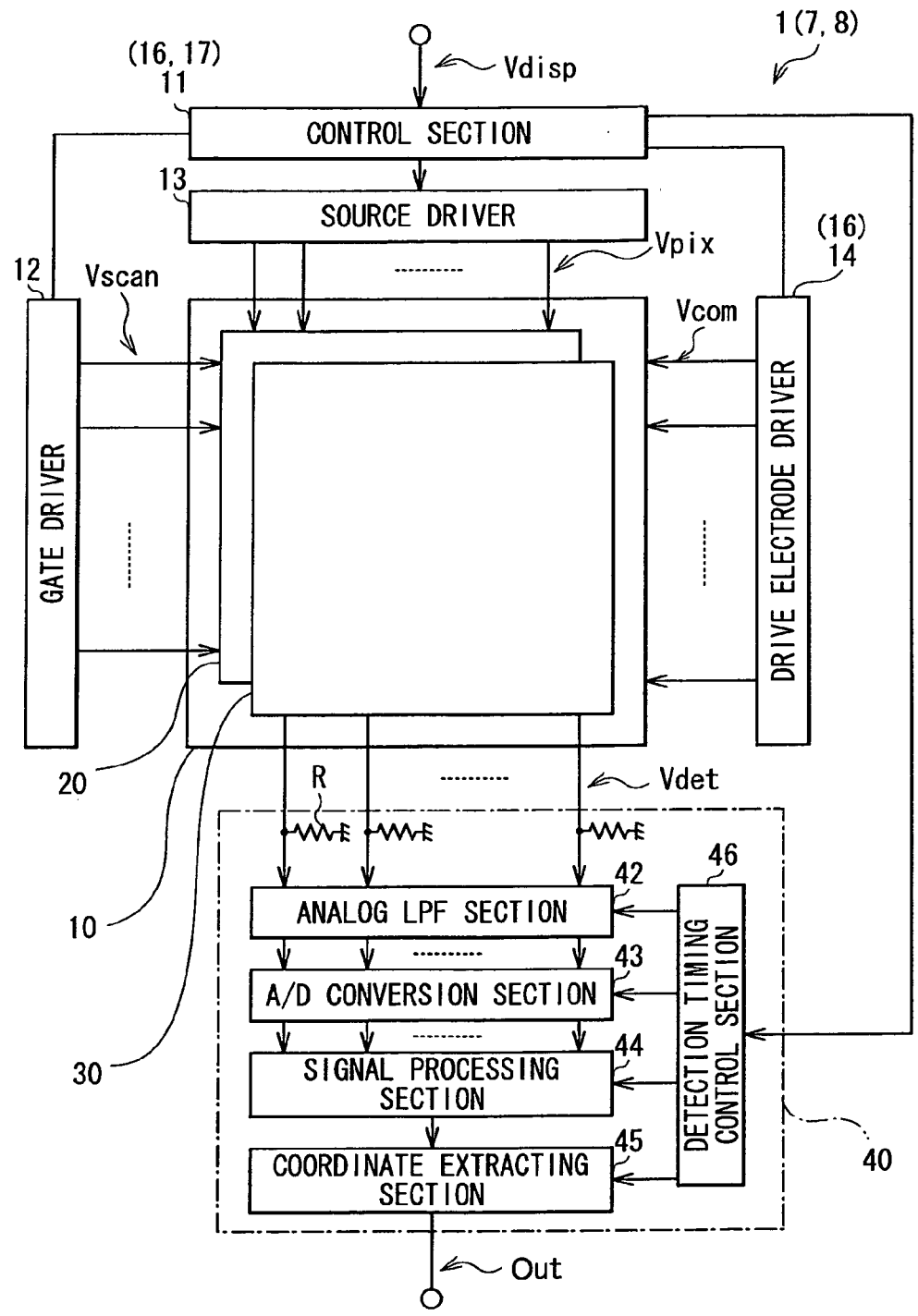
FIG. 4 is a block diagram illustrating a configuration example of a display device with a touch detection function according to the embodiments of the disclosure.

FIG. 4 illustrates a configuration example of a display device with a touch detection function 1 according to a first embodiment of the disclosure. Incidentally, a control circuit and a driving method of a display device with a touch detection function according to the embodiment of the disclosure are implemented by the first embodiment, so the description thereof will be given together. The display device with a touch detection function uses a liquid crystal display element as a display element, and is of a so-called in-cell type in which a liquid crystal display section configured of the liquid crystal display element and an electrostatic capacitance type touch detection section are integrated.

The display device with a touch detection function 1 includes a control section 11, a gate driver 12, a source driver 13, a drive electrode driver 14, a display section with a touch detection function 10, and a touch detection circuit 40.

The control section 11 is a circuit supplying a control signal to the gate driver 12, the source driver 13, the drive electrode driver 14, and the touch detection circuit 40 based on a picture signal Vdisp supplied from outside, and controlling these parts to operate in synchronization with one another.

The gate driver 12 has a function to sequentially select one horizontal line which is a target of display drive of the display section with a touch detection function 10, based on the control signal supplied from the control section 11. Specifically, as described later, the gate driver 12 applies a scan signal Vscan to a gate of a TFT element Tr of a pixel Pix through a scan signal line GCL to sequentially select, as a target of display drive, one row (one horizontal line) in the pixels Pix formed in a matrix in a liquid crystal display section 20 of the display section with a touch detection function 10.

The source driver 13 is a circuit supplying a pixel signal Vpix to each pixel Pix (described later) in the display section with a touch detection function 10 based on the control signal supplied from the control section 11. Specifically, the source driver 13 supplies the pixel signal Vpix to each pixel Pix configuring one horizontal line sequentially selected by the gate driver 12 through a pixel signal line SGL as described later. Then, in the pixels Pix, display for the horizontal line is performed in response to the supplied pixel signal Vpix.

The drive electrode driver 14 is a circuit supplying a drive signal Vcom to drive electrodes COML (described later) of the display section with a touch detection function 10 based on the control signal supplied from the control section 11. Specifically, the drive electrode driver 14 drives the drive electrodes COML for each block (drive electrode block B)

configured of a predetermined number of the drive electrodes COML as described later. In a display operation period Pd in which a display operation is performed, the drive electrode driver 14 applies a display drive signal Vcomd, and in a touch detection operation period Pt in which a touch detection operation is performed, the drive electrode driver 14 applies a touch detection drive signal Vcomt. Herein, the touch detection drive signal Vcomt has a higher frequency than that of the display drive signal Vcomd, and may be set to the frequency of approximately 10 times the frequency of the display drive signal Vcomd, for example. In the touch detection operation, the touch detection drive signal Vcomt is sequentially applied for each drive electrode block B in a time-divisional manner so that a block performing the touch detection operation (detection block) is sequentially selected. Then, the touch detection section 30 outputs a touch detection signal Vdet for each detection block from a plurality of touch detection electrodes TDL (described later), and supplies the signal to the touch detection circuit 40.

The display section with a touch detection function 10 is a display section incorporating a touch detection function. The display section with a touch detection function 10 includes the liquid crystal display section 20 and the touch detection section 30. As described later, the liquid crystal display section 20 is a section performing sequential scanning on one horizontal line basis to perform display according to the scan signal Vscan supplied from the gate driver 12. The touch detection section 30 operates based on the above-described basic principle of the electrostatic capacitance type touch detection, and outputs the touch detection signal Vdet. As described later, the touch detection section 30 performs sequential scanning on one detection block basis according to the touch detection drive signal Vcomt supplied from the drive electrode driver 14 to perform touch detection.

The touch detection circuit 40 is a circuit detecting the presence of touch events with respect to the touch detection section 30 based on the control signal supplied from the control section 11 and the touch detection signal Vdet supplied from the touch detection section 30 of the display section with a touch detection function 10, and when the touch event is detected, the touch detection circuit 40 determines the coordinate and the like in a touch detection region. The touch detection circuit 40 includes an analog LPF (low pass filter) section 42, an A/D conversion section 43, a signal processing section 44, a coordinate extracting section 45, and a detection timing control section 46. The analog LPF section 42 is a low-pass analog filter which removes high-frequency component (noise component) contained in the touch detection signal Vdet supplied from the touch detection section 30 to extract touch component, and outputs the touch component. A resistor R for applying a direct-current potential (0V) is connected between an input terminal of the analog LPF section 42 and the ground. Incidentally, by providing a switch, for example, instead of the resistor R and turning the switch on at a predetermined time, the direct-current potential (0V) may be provided. The A/D conversion section 43 is a circuit converting an analog signal output from the analog LPF section 42 into a digital signal by sampling at timings in synchronization with the touch detection drive signal Vcomt. The signal processing section 44 is a logic circuit detecting the presence of touch events with respect to the touch detection section 30 based on the output signal of the A/D conversion section 43. The coordinate extracting section 45 is a logic circuit determining a touch panel coordinate when the touch event is detected by the signal processing section 44. The detection timing control section 46 controls these circuits to operate in synchronization with one another.

(Display Section with a Touch Detection Function 10)

Next, the configuration example of the display section with a touch detection function 10 will be described in detail.

Figure 5:
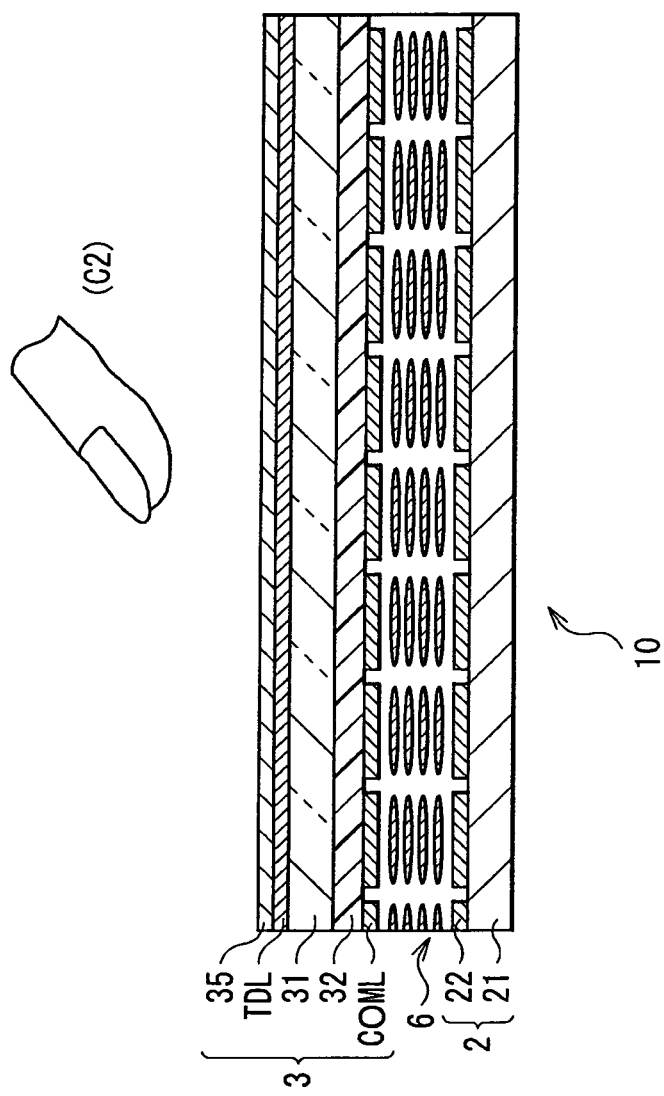
FIG. 5 is a sectional view illustrating a schematic cross-sectional configuration of a display section with a touch detection function according to a first embodiment.

FIG. 5 illustrates an example of a cross-sectional configuration of a relevant part of the display section with a touch detection function 10. The display section with a touch detection function 10 has a pixel substrate 2, a facing substrate 3 disposed to face the pixel substrate 2, and a liquid crystal layer 6 inserted between the pixel substrate 2 and the facing substrate 3.

The pixel substrate 2 includes a TFT substrate 21 as a circuit substrate and a plurality of pixel electrodes 22 arranged in a matrix on the TFT substrate 21. In the TFT substrate 21, although not illustrated, thin film transistors (TFTs) for each pixels, and wirings such as the pixel signal line SGL for supplying the pixel signal Vpix to the pixel electrodes 22 and the scan signal line GCL for driving TFTs are formed.

The facing substrate 3 includes a glass substrate 31, a color filter 32 formed on a surface of the glass substrate 31, and a plurality of drive electrodes COML formed on the color filter 32. The color filter 32 is configured, for example, by cyclically arranging three color filter layers of red (R), green (G), and blue (B), and a set of three colors of R, G, and B corresponds to each display pixel. The drive electrodes COML function as common drive electrodes for the liquid crystal display section 20, and function as drive electrodes for the touch detection section 30. In this example, the drive electrodes COML are arranged so that one drive electrode COML corresponds to one pixel electrode 22 (pixel electrode configuring one line). The drive electrodes COML are connected to the TFT substrate 21 through a contact conducting cylinder (not illustrated), and the drive signal Vcom (the display drive signal Vcomd and the touch detection drive signal Vcomt) with the alternating rectangular waveform is applied from the TFT substrate 21 to the drive electrodes COML through the contact conducting cylinder. On the other surface of the glass substrate 31, the touch detection electrodes TDL are formed as detection electrodes of the touch detection section 30, and a polarizing plate 35 is disposed on the touch detection electrodes TDL.

The liquid crystal layer 6 modulates light passing therethrough according to a state of electric field, and liquid crystal of various modes such as TN (twisted nematic), VA (vertical alignment), and ECB (electrically controlled birefringence) is used.

Incidentally, an alignment film is disposed between the liquid crystal layer 6 and the pixel substrate 2, and between the liquid crystal layer 6 and the facing substrate 3. In addition, an incident-side polarizing plate is disposed on a bottom surface side of the pixel substrate 2, which is not illustrated in the figure.

Figure 6:
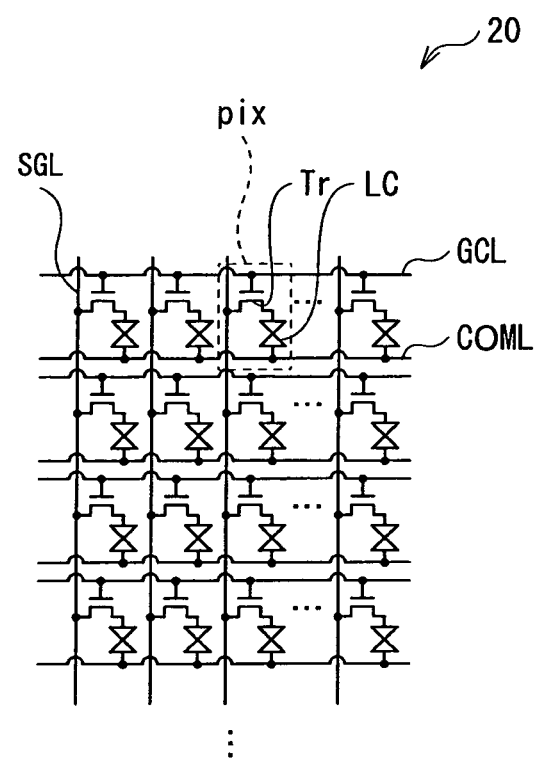
FIG. 6 is a circuit diagram illustrating a pixel arrangement of the display section with a touch detection function according to the first embodiment.

FIG. 6 illustrates a configuration example of a pixel configuration in the liquid crystal display section 20. The liquid crystal display section 20 has the plurality of pixels Pix arranged in a matrix. Each of the pixels Pix has a TFT element Tr and a liquid crystal element LC. The TFT element Tr is configured of a thin film transistor, and in this example, the TFT element Tr is configured of an n-channel MOS (metal oxide semiconductor) TFT. A source of the TFT element Tr is connected to the pixel signal line SGL, a gate thereof is connected to the scan signal line GCL, and a drain thereof is connected to one end of the liquid crystal element LC. One end of the liquid crystal element LC is connected to the drain of the TFT element Tr, and the other end thereof is connected to the drive electrode COML.

Each of the pixels Pix is connected mutually, by the scan signal line GCL, to the other pixel Pix which are in the same row of the liquid crystal display section 20. The scan signal line GCL is connected to the gate driver 12, and the scan signal Vscan is supplied from the gate driver 12. In addition, one of the pixels Pix is connected mutually, by the pixel signal line SGL, to the other pixels Pix which are in the same column of the liquid crystal display section 20. The pixel signal line SGL is connected to the source driver 13, and the pixel signal Vpix is supplied from the source driver 13.

Moreover, each of the pixels Pix is connected mutually, through the drive electrode COML, to the other pixels Pix which are in the same column of the liquid crystal display section 20. The drive electrodes COML are connected to the drive electrode driver 14, and the drive signal Vcom (the display drive signal Vcomd and the touch detection drive signal Vcomt) is supplied from the drive electrode driver 14. In other words, the plurality of pixels Pix which are in the same column commonly uses one drive electrode COML in this example.

With this configuration, in the liquid crystal display section 20, the gate driver 12 drives the scan signal line GCL to perform line-sequential scanning in a time-divisional manner so that one horizontal line is sequentially selected. Then, the source driver 13 supplies the pixel signal Vpix to the pixels Pix in the selected horizontal line to perform display on one horizontal line basis. When the display operation is performed, the drive electrode driver 14 applies the display drive signal Vcomd to the drive electrode block B including the drive electrode COML corresponding to the one horizontal line.

Figure 7:
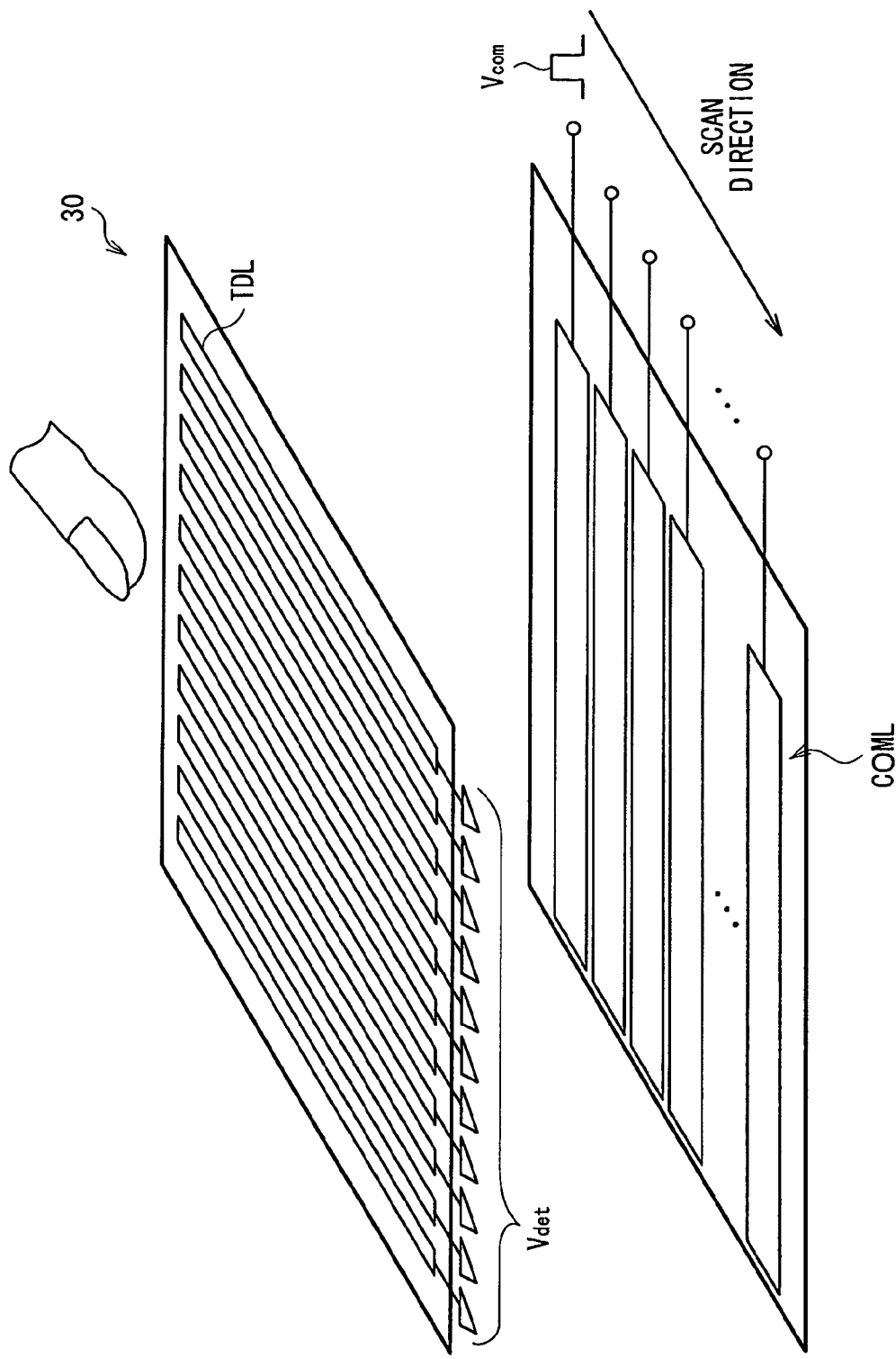
FIG. 7 is a perspective view illustrating a configuration example of drive electrodes and touch detection electrodes of the display section with a touch detection function according to the first embodiment.

FIG. 7 is a perspective view illustrating a configuration example of the touch detection section 30. The touch detection section 30 is configured of the drive electrodes COML and the touch detection electrodes TDL arranged in the facing substrate 3. Each of the drive electrodes COML is configured of a stripe-shaped electrode pattern extending in a lateral direction of the figure. When a touch detection operation is performed, in the each electrode pattern, the touch detection drive signal Vcomt is sequentially supplied to the drive signal block B by the drive electrode driver 14, and line-sequential scan drive is performed in a time-divisional manner as described later. Each of the touch detection electrodes TDL is configured of a stripe-shaped electrode pattern extending in a direction intersecting with an extending direction of the electrode patterns of the drive electrodes COML. The electrode pattern of each of the touch detection electrodes TDL is connected to each input of the analog LPF section 42 of the touch detection circuit 40. The electrode patterns of the drive electrodes COML and the electrode patterns of the touch detection electrodes TDL intersecting with each other form an electrostatic capacitance at each intersection.

With this configuration, in the touch detection section 30, when the touch detection operation is performed, the drive electrode driver 14 drives the drive electrode block B to be line-sequentially scanned in the time-divisional manner so that one detection block is sequentially selected. Then, the touch detection electrodes TDL output the touch detection signal Vdet to perform touch detection for one detection block. In other words, the drive electrode block B corresponds to the drive electrode E1 in the basic principle of the touch detection illustrated in FIGS. 1 to 3, and the touch detection electrodes TDL correspond to the touch detection electrode E2. The touch detection section 30 detects touch events in accordance with the basic principle. As illustrated in FIG. 7, the electrode patterns intersecting with each other configure an electrostatic capacitance type touch sensor in a matrix. Therefore, scanning is performed over the entire touch detection surface of the touch detection section 30 so that a contact position or a proximal position of the external proximity object is also detectable.

Herein, the liquid crystal elements LC correspond to a specific example of "display elements" of the disclosure. The gate driver 12 and the drive electrode driver 14 correspond to a specific example of "a scan drive section" of the disclosure. The drive electrodes COML correspond to a specific example of "common drive electrodes" of the disclosure.

[Operations and Functions]

Subsequently, operations and functions of the display device with a touch detection function 1 of the embodiment will be described.

(General Operation Outline)

The control section 11 supplies the control signal to the gate driver 12, the source driver 13, the drive electrode driver 14, and the touch detection circuit 40 based on the picture signal Vdisp supplied from outside, and controls these parts to operate in synchronization with one another. The gate driver 12 supplies the scan signal Vscan to the liquid crystal display section 20 in the display operation period Pd to sequentially select one horizontal line to be driven for display. The source driver 13 supplies the pixel signal Vpix to each pixel Pix configuring the horizontal line selected by the gate driver 12 in the display operation period Pd. The drive electrode driver 14 applies the display drive signal Vcomd to the drive electrode block B according to one horizontal line in the display operation period Pd, and sequentially applies the touch detection drive signal Vcomt with higher frequency than that of the display drive signal Vcomd to the drive electrode block B according to the touch detection operation in the touch detection operation period Pt to sequentially select one detection block. The display section with a touch detection function 10 performs display operation based on the signals supplied from the gate driver 12, the source driver 13, and the drive electrode driver 14 in the display operation period Pd, and performs touch detection operation based on the signal supplied from the drive electrode driver 14 in the touch detection operation period Pt, to output the touch detection signal Vdet from the touch detection electrodes TDL. The analog LPF section 42 removes high-frequency component from the touch detection signal Vdet to output the resultant signal. The A/D conversion section 43 converts an analog signal output from the analog LPF section 42 into a digital signal at timings in synchronization with the touch detection drive signal Vcomt. The signal processing section 44 detects the presence of touch events with respect to the touch detection section 30 based on the output signal from the A/D conversion section 43. The coordinate extracting section 45 determines a touch panel coordinate in response to touch detection of the signal processing section 44. The detection timing control section 46 controls the analog LPF section 42, the A/D conversion section 43, the signal processing section 44, and the coordinate extracting section 45 to operate in synchronization with one another.

(Detailed Operations)

Next, detailed operations of the display device with a touch detection function 1 will be described.

Figure 8:
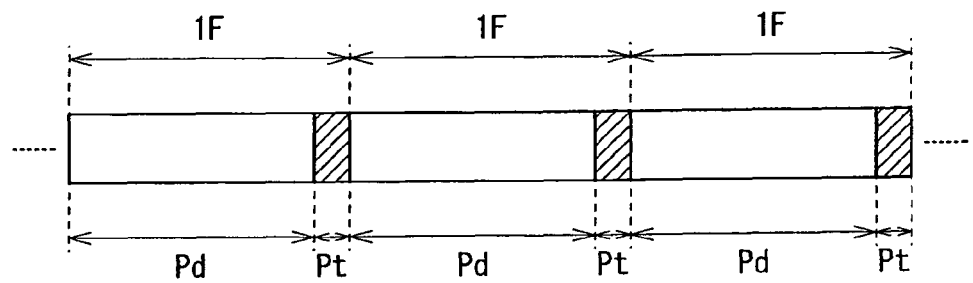
FIG. 8 is a schematic diagram illustrating a relationship between a display operation period and a touch detection operation period according to the first embodiment.

FIG. 8 schematically illustrates a relationship between the display operation period Pd and the touch detection operation period Pt. As illustrated in FIG. 8, one frame period (1F) includes the display operation period Pd and the touch detection operation period Pt. In other words, the touch detection operation period Pt is arranged in a vertical blanking period of the display operation. In each of the touch detection operation period Pt, the display device with a touch detection function 1 performs, for example, touch detection for one screen of the display surface/touch detection surface S (described later). Note that this is not limitative, and alternatively, the display device may perform touch detection for one screen or more, or for a part of a screen, for example.

In the touch detection operation period Pt (the vertical blanking period) in which the touch detection operation is performed, various kinds of signals (the scan signal Vscan and the pixel signal Vpix) for performing the display operation are not applied to the liquid crystal display device 20. Therefore, in the touch detection operation period Pt, in FIG. 5, the scan signal line GCL and the pixel signal line SGL (both not illustrated) formed in the pixel substrate 2 are in a floating state or a state where a direct-current potential is applied. Accordingly, possibility of noise transmission from the scan signal line GCL and the pixel signal line SGL to the touch detection electrode TDL through a parasitic capacitance may be reduced. In other words, in the display device with a touch detection function 1, it is possible to reduce influence of the internal noise on the touch detection operation.

Figures 9A, 9B, 9C:
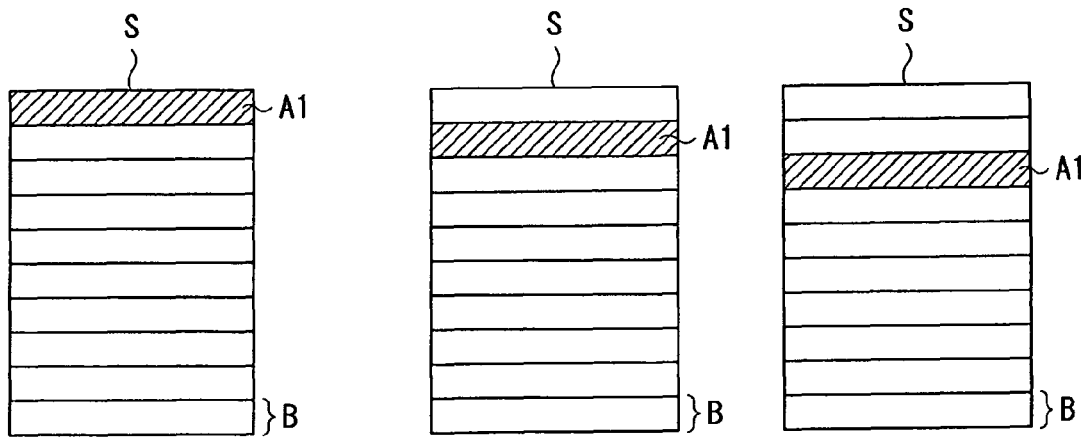
FIGS. 9A to 9C are schematic diagrams illustrating an operation example of a drive electrode driver according to the first embodiment.

FIGS. 9A to 9C schematically illustrate an operation example of the drive electrode driver 14. FIGS. 9A to 9C illustrate an application operation of the drive signal Vcom (the display drive signal Vcomd and the touch detection drive signal Vcomt) by the drive electrode driver 14 in a case where the display surface/touch detection surface S is configured of ten drive electrode blocks B. Note that in the example, the number of the drive electrode blocks B is ten for the sake of simplifying description; however, the number is not limited thereto.

The drive electrode driver 14 concurrently applies the drive signal Vcom to a predetermined number of the drive electrodes COML which configure the drive electrode block B. Specifically, in the display operation period Pd, the drive electrode driver 14 concurrently applies the display drive signal Vcomd to the predetermined number of the drive electrodes COML which configure the drive electrode block B (drive signal applied block A1). Then, the drive electrode driver 14 performs display scanning by sequentially applying the display drive signal Vcomd to the drive electrode block B. Likewise, in the touch detection operation period Pt, the drive electrode driver 14 concurrently applies the touch detection drive signal Vcomt to the predetermined number of the drive electrodes COML (drive signal applied block A1), and performs touch detection scanning by sequentially applying the touch detection drive signal Vcomt to the drive electrode block B.

The detailed operations in the display operation period Pd and the touch detection operation period Pt will be described below with reference to some drawings.

(Operations in Display Operation Period Pd)

Figure 10:
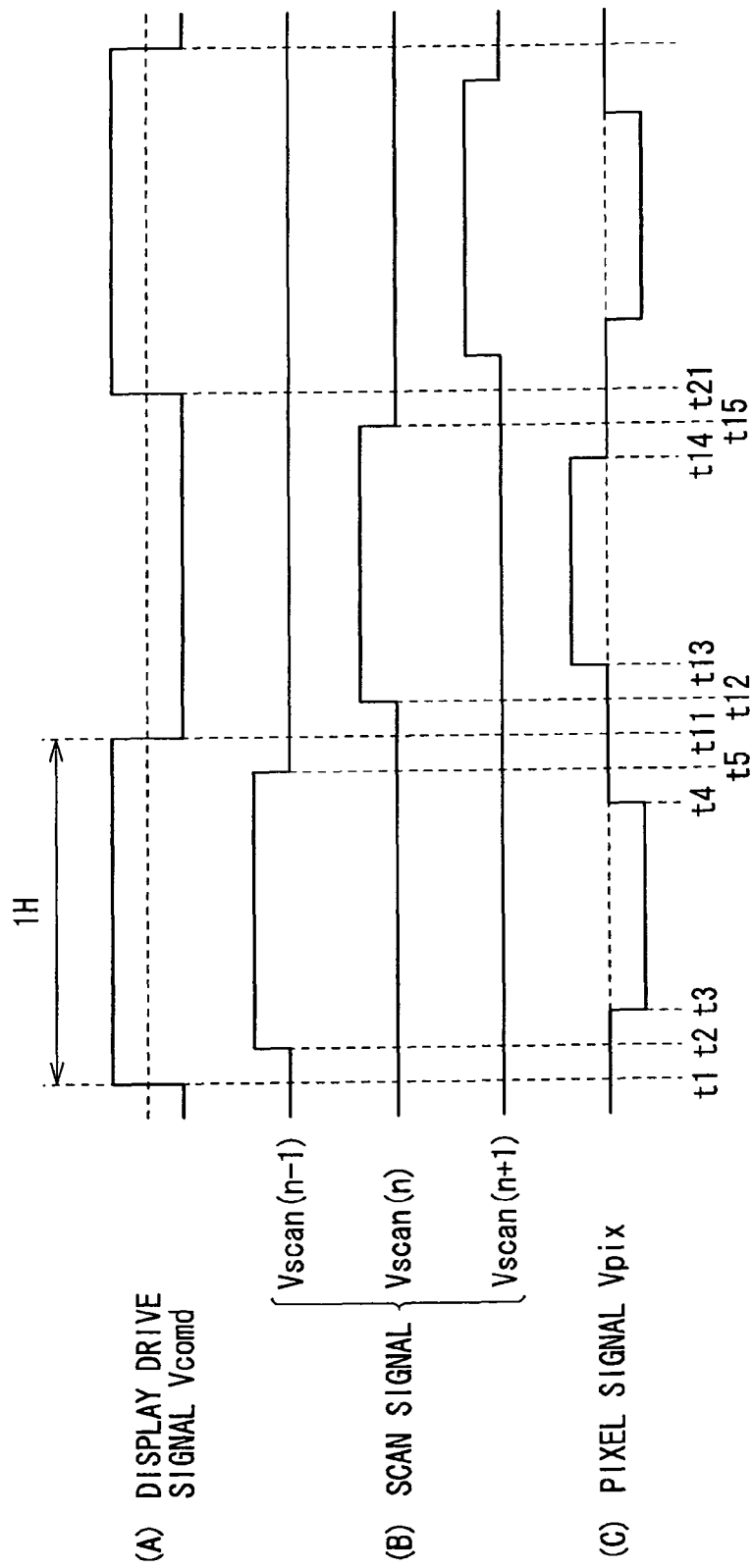
FIG. 10 is a timing waveform chart illustrating an operation example in the display operation period of the display device with a touch detection function according to the first embodiment.

FIG. 10 illustrates an example of timing waveforms of the display device with a touch detection function 1 in the display operation period Pd, where (A) illustrates a waveform of the display drive signal Vcomd, (B) illustrates waveforms of the scan signal Vscan, and (C) illustrates a waveform of the pixel signal Vpix. For the convenience of the description, it is assumed that FIG. 10 illustrates operations in a case where the display drive signal Vcomd is applied to a certain drive electrode block B. In other words, it is assumed that the drive signal applied block A1 does not shift in the description of FIG. 10.

The display device with a touch detection function 1 performs display operation based on the display drive signal Vcomd, the scan signal Vscan, and the pixel signal Vpix in the display operation period Pd. The operation will be described in detail below.

First, the drive electrode driver 14 applies the display drive signal Vcomd to the drive signal applied block A1 at a timing t1 to allow the voltage level to change from low to high ((A) of FIG. 10). Thus, one horizontal period (1H) starts.

Next, the gate driver 12 applies the scan signal Vscan to the scan signal line GCL of the pixel in (n−1)-th line included in the drive signal applied block A1 at a timing t2. Thus, the scan signal Vscan(n−1) changes from low level to high level ((B) of FIG. 10).

Next, the source driver 13 applies the pixel signal Vpix to the pixel signal line SGL in a period from a timing t3 to a timing t4 ((C) of FIG. 10) to start display on one horizontal line.

After the source driver 13 finishes application of the pixel signal Vpix, the gate driver 12 allows the scan signal Vscan(n−1) to change from high level to low level at a timing t5 ((B) of FIG. 10).

Next, the drive electrode driver 14 allows the voltage level of the display drive signal Vcomd to change from high to low at a timing t11 ((A) of FIG. 10). Thus, a subsequent one horizontal period (1H) starts.

Then, the gate driver 12 applies the scan signal Vscan to the scan signal line GCL of the pixel in n-th line included in the drive signal applied block A1 at a timing t12. Thus, the scan signal Vscan(n) changes from low level to high level ((B) of FIG. 10).

Subsequently, the source driver 13 applies the pixel signal Vpix to the pixel signal line SGL in a period from a timing t13 to a timing t14 ((C) of FIG. 10) to start display on one horizontal line. Note that in this example, since the display device with a touch detection function 1 performs inversion driving, the pixel signal Vpix applied by the source driver 13 is inverted in the polarity compared with the pixel signal Vpix in the previous horizontal period.

After that, the gate driver 12 allows the scan signal Vscan(n) to change from high level to low level at a timing t15 ((B) of FIG. 10).

By subsequently repeating the above-described operations, the display device with a touch detection function 1 performs display operation on a region corresponding to the drive signal applied block A1 in the display surface/touch detection surface S. Then, as illustrated in FIG. 9, while shifting the drive signal applied block A1 sequentially, the display device with a touch detection function 1 performs the display operation on each drive signal applied block A1 to perform the display operation on the entire surface of the display surface/touch detection surface S.

(Operations in Touch Detection Operation Period Pt)

FIG. 11 illustrates an example of timing waveforms of the display device with a touch detection function 1 in the touch detection operation period Pt, where (A) illustrates a waveform of the touch detection drive signal Vcomt, (B) illustrates a waveform of the touch detection signal Vdet, and (C) illustrates a waveform of the display drive signal Vcomd. The waveform of the display drive signal Vcomd in (C) of FIG. 11 is illustrated as a reference for representing a frequency difference from the touch detection drive signal Vcomt ((A) of FIG. 11). In other words, the drive electrode driver 14 outputs the touch detection drive signal Vcomt and operates so as not to output the display drive signal Vcomd in the display detection operation period Pt. Note that similarly to FIG. 10, for the convenience of the description, it is assumed that FIG. 11 illustrates operations in a case where the display drive signal Vcomd is applied to a certain drive electrode block B. In other words, the drive signal applied block A1 does not shift in the description of FIG. 11.

In the touch detection operation period Pt, the drive electrode driver 14 applies the drive signal applied block A1 with the touch detection drive signal Vcomt ((A) of FIG. 11) with higher frequency than that of the display drive signal Vcomd ((C) of FIG. 11). The touch detection drive signal Vcomt is transmitted to the touch detection electrodes TDL through the electrostatic capacitance to change the touch detection signal Vdet ((B) of FIG. 11). The A/D conversion section 43 A/D-converts the output signal from the analog LPF section 42 which has received the touch detection signal Vdet at a sampling timing is in synchronization with the touch detection drive signal Vcomt ((B) of FIG. 11). In other words, the A/D conversion section 43 performs sampling with a period shorter than the display scan period (1H).

Accordingly, the display device with a touch detection function 1 performs the touch detection operation with respect to a region (one detection block) in the display surface/touch detection surface S corresponding to the drive signal applied block A1. Then, as illustrated in FIG. 9, while shifting the drive signal applied block A1 sequentially, the display device with a touch detection function 1 performs the touch detection operation on each drive signal applied block A1 to perform the touch detection operation on the entire surface of the display surface/touch detection surface S.

Figure 12A:
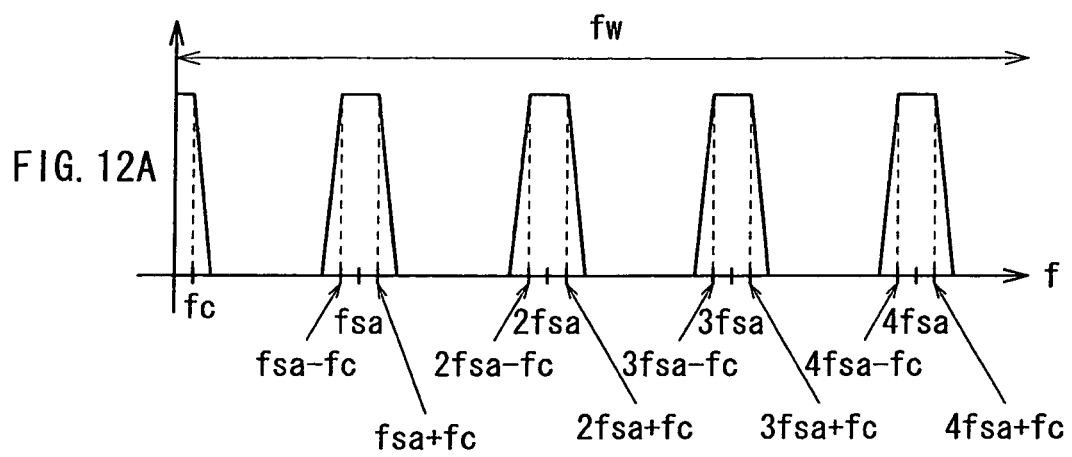
FIGS. 12A and 12B are diagrams illustrating an example of spectrum for explaining noise reduction of a touch detection circuit according to the embodiments.
Figure 12B:
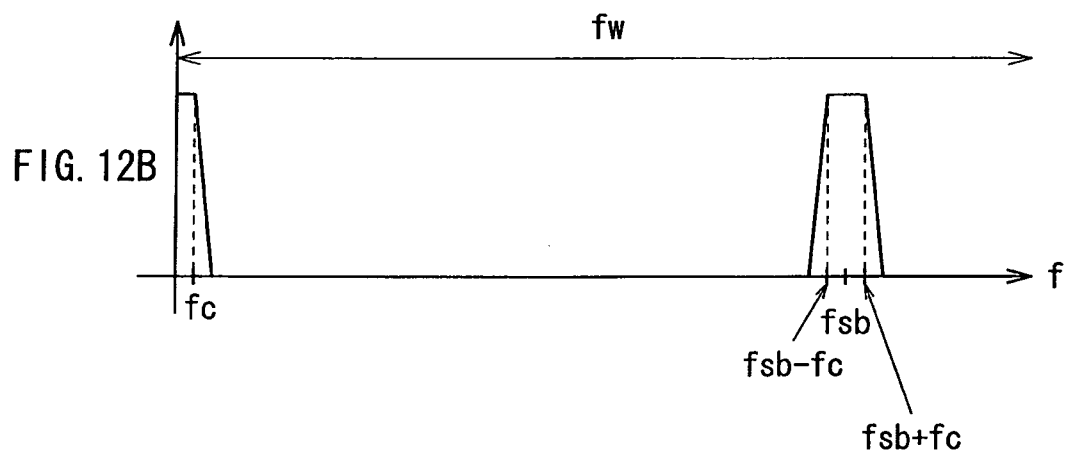

FIGS. 12A and 12B illustrate which frequency components in the input signal of the A/D conversion section 43 are outputted from the A/D conversion section 43, where FIG. 12A illustrates a case where a sampling frequency is low, and FIG. 12B illustrates a case where a sampling frequency is high.

Generally, when sampling is performed at a sampling frequency fs, frequency components equal to or higher than the Nyquist frequency (fs/2) of the input signal appear in the output signal as frequency components equal to or lower than fs/2 (folding noise). Specifically, for example, as illustrated in FIG. 12A, the components in the vicinity (±fc) of the frequency of an integral multiple of the sampling frequency fsa (harmonic frequencies: fsa, 2fsa, 3fsa, . . . ) are outputted as components in the vicinity of the frequency 0. Here, fc is a cut-off frequency fc of the analog LPF section 42. In other words, when receiving noise components in the vicinity of the frequency of an integral multiple of the sampling frequency fsa in addition to touch components in the vicinity of the frequency 0, the A/D conversion section 43 outputs the touch components and the noise components as components in the vicinity of the frequency 0. In other words, in the signal processing section 44 following the A/D conversion section 43, the separation of the noise components and the touch components becomes difficult.

As illustrated in FIGS. 12A and 12B, in a case where the sampling frequency is high (FIG. 12B), the number of spectrum of the harmonic frequency within the same frequency width fw is small compared with a case where the sampling frequency is low (FIG. 12A), and thus the noise components appearing in the A/D conversion section 43 may be reduced.

The display device with a touch detection function 1 applies the drive electrode block B (the drive signal applied block A1) with the touch detection drive signal Vcomt with higher frequency than that of the display drive signal Vcomd, and samples the touch detection signal Vdet output from the touch detection electrodes TDL at timings in synchronization with the touch detection drive signal Vcomt. Accordingly, compared with a case where the display drive signal Vcomd is applied to the drive electrode block B to sample the touch detection signal Vdet at timings in synchronization with the display drive signal Vcomd, sampling is performed at high frequency so that the noise components are reduced. Therefore, for example, even in a case where external noise is transmitted to the touch detection device, the noise components appearing in the output of the A/D conversion section 43 caused by the external noise may be reduced. In other words, in the display device with a touch detection function 1, influence of the external noise on the touch detection operation may be reduced.

[Effects]

As describe above, in the embodiment, the touch detection operation is performed in the touch detection operation period Pt different from the display operation period Pd. Therefore, influence of internal noise may be reduced.

Moreover, in the embodiment, the touch detection signal is sampled with a period shorter than the display scan period. Therefore, compared with a case of sampling with the display scan period, influence of noise may be reduced. In particular, even in a case where external noise is input, the influence of the external noise may be reduced.

Furthermore, in the embodiment, in the touch detection operation, the touch detection drive signal Vcomt different from the display drive signal Vcomd is used. Therefore, the touch detection operation with high flexibility is achievable.

[Modification 1-1]

Although in the above-described embodiment, the frequency of the touch detection drive signal Vcomt is higher than that of the display drive signal Vcomd, this is not limitative. Alternatively, for example, the frequency of the touch detection drive signal Vcomt may be equal to or lower than that of the display drive signal Vcomd. An example of a case where the frequency of the touch detection drive signal Vcomt is equal to that of the display drive signal Vcomd will be described below.

Figure 13:
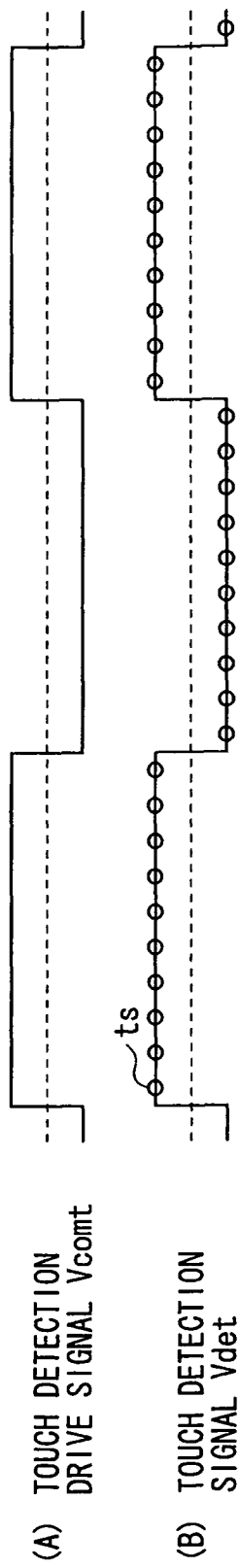
FIG. 13 is a timing waveform chart illustrating an operation example in a touch detection operation period of a display device with a touch detection function according to a modification of the first embodiment.

FIG. 13 illustrates an example of timing waveforms of the display device with a touch detection function 1 in the touch detection operation period Pt, and illustrates a case of using the touch detection drive signal Vcomt with the same frequency as that of the display drive signal Vcomd.

The drive electrode driver 14 applies the drive signal applied block A1 with the touch detection drive signal Vcomt with the same frequency as that of the display drive signal Vcomd in the touch detection operation period Pt ((A) of FIG. 13). The touch detection drive signal Vcomt is transmitted to the touch detection electrodes TDL through the electrostatic capacitance to change the touch detection signal Vdet ((B) of FIG. 13). The A/D conversion section 43 samples the output signal of the analog LPF section 42 which has received the touch detection signal Vdet to perform A/D conversion with a period shorter than the display scan period (1H) ((B) of FIG. 13).

Also in this case, the sampling is performed with a period shorter than the display scan period. Therefore, compared with the case where the sampling is performed at timings in synchronization with the display drive signal Vcomd, namely, compared with the case where the sampling is performed with the display scan period, influence of noise may be reduced.

[Modification 1-2]

Although in the above-described embodiment, the drive electrodes COML are driven and scanned for each of the drive electrode blocks B configured of the predetermined number of the drive electrodes COML, this is not limitative. Alternatively, for example, while the predetermined numbers of the drive electrodes COML are concurrently driven, the drive electrodes COML thus driven concurrently are scanned by shifting one by one. The detail thereof will be described below.

Figures 14A, 14B, 14C:
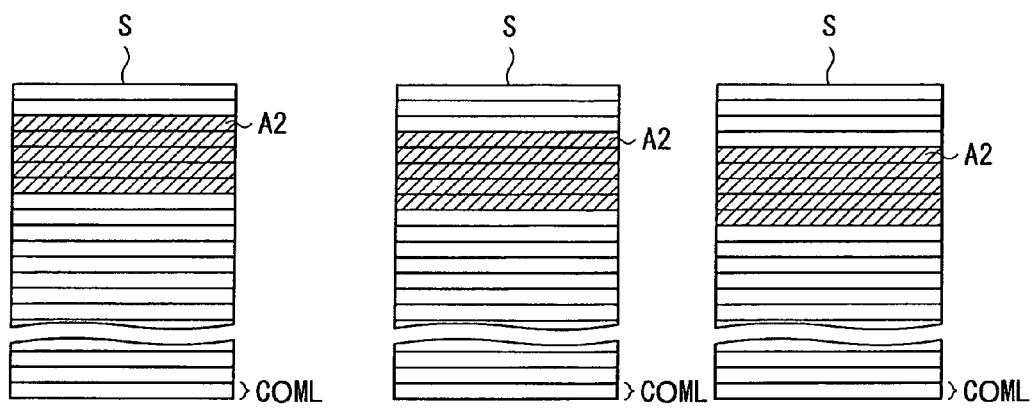
FIGS. 14A to 14C are schematic diagrams illustrating an operation example of a drive electrode driver according to the modification of the first embodiment.

FIG. 14 schematically illustrates an operation example of a drive electrode driver 14B according to the modification 1-2. The drive electrode driver 14B concurrently applies the drive signal Vcom to the predetermined number of the drive electrodes COML. Specifically, in the display operation period Pd, the drive electrode driver 14B concurrently applies the display drive signal Vcomd to the predetermined number of (in this case, five) drive electrodes COML (drive signal application electrode A2). Then, the drive electrode driver 14B performs display scanning by shifting one by one the drive electrodes COML to be applied with the display drive signal Vcomd. Likewise, in the touch detection operation period Pt, the drive electrode driver 14B concurrently applies the touch detection drive signal Vcomt to the predetermined number of the drive electrodes COML (drive signal application electrode A2), and performs the touch detection scanning by shifting one by one the drive electrodes COML to be applied with the touch detection drive signal Vcomt. Incidentally, although the drive signal Vcom is concurrently applied to the five drive electrodes COML in this example, this is not limitative. Alternatively, four or less, or six or more drive electrodes COML may be applied with the drive signal Vcom concurrently. In addition, although the drive electrodes COML to be applied with the drive signal Vcom are shifted one by one in this example, this is not limitative. Alternatively, the drive electrodes COML may be shifted two by two (or n by n).

Figure 15:
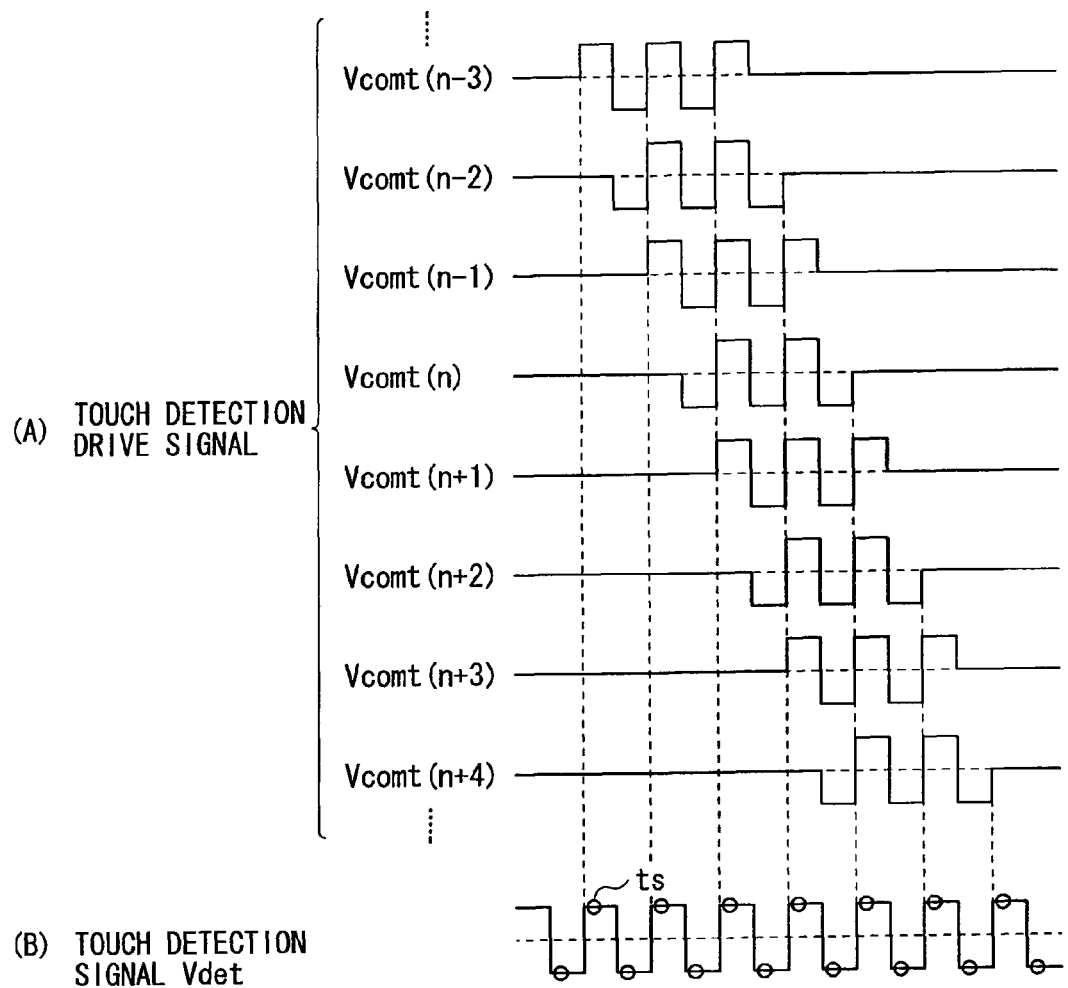
FIG. 15 is a timing waveform chart illustrating an operation example of the touch detection operation of the display device with a touch detection function according to the modification of the first embodiment.

FIG. 15 illustrates an example of the touch detection operation according to the modification, where (A) illustrates waveforms of the touch detection drive signals Vcomt, and (B) illustrates a waveform of the touch detection signal Vdet. (A) of FIG. 15 illustrates the touch detection drive signals Vcomt applied to each of the drive electrodes COML, and for example, the touch detection drive signal Vcomt applied to the n-th drive electrode COML is illustrated as a touch detection drive signal Vcomt(n).

As illustrated in (A) of FIG. 15, in this example, the drive electrode driver 14B according to the modification applies the touch detection drive signals Vcomt to the five drive electrodes COML, and performs sequential scanning by shifting one by one the drive electrodes COML to be applied with the touch detection drive signals Vcomt. The touch detection drive signal Vcomt is transmitted to the touch detection electrodes TDL through the electrostatic capacitance to change the touch detection signal Vdet ((B) of FIG. 15). The A/D conversion section 43 A/D-converts the output signal of the analog LPF section 42 which has received the touch detection signal Vdet at a sampling timing is in synchronization with the touch detection drive signal Vcomt ((B) of FIG. 15).

Accordingly, the display device with a touch detection function 1 performs the touch detection operation with respect to a region in the display surface/touch detection surface S corresponding to the drive signal application electrode A2. Then, as illustrated in FIG. 14, while shifting the drive signal application electrode A2 sequentially, the display device with a touch detection function 1 performs the touch detection operation. Therefore, the touch detection operation is performed over the entire surface of the display surface/touch detection surface S.

[Modification 1-3]

Figure 16:
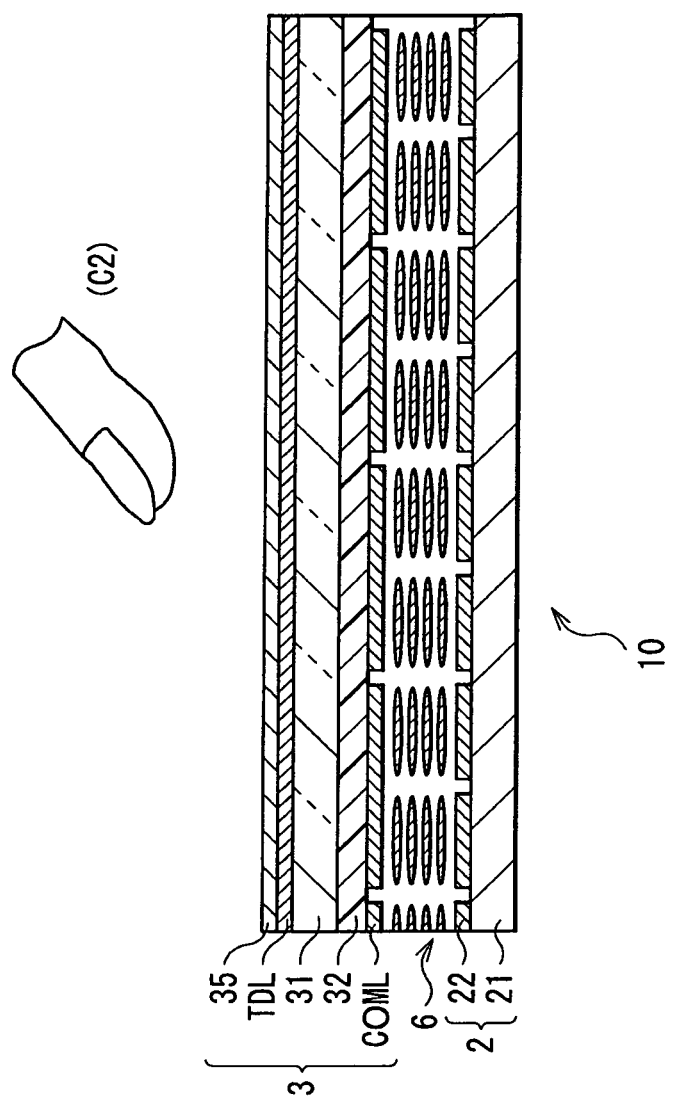
FIG. 16 is a sectional view illustrating a schematic cross-sectional configuration of a display section with a touch detection function according to the modification of the first embodiment.

Although in the above-described embodiment, one drive electrode COML is disposed to correspond to one pixel electrode 22 (pixel electrode 22 configuring one line), this is not limitative. Alternatively, for example, one drive electrode COML may be formed thick and disposed to correspond to a plurality of pixel electrodes 22 (pixel electrodes 22 configuring plural lines). FIG. 16 illustrates an example of a case where one drive electrode COML is disposed to correspond to two pixel electrodes 22.

3. Second Embodiment

Next, a display device with a touch detection function 7 according to a second embodiment of the disclosure will be described. In the above-described first embodiment (FIG. 8), the touch detection operation is performed in the display blanking period. In the second embodiment, the touch detection operation is performed by interrupting the display for one screen, in addition to the blanking period. In other words, the display device with a touch detection function 7 is configured with use of a control section 16 controlling operation to be performed at such timings. The other configurations are the same as those of the above-described first embodiment (FIG. 1 and the like). Note that like numerals are used to designate substantially like components of the display device with a touch detection function 1 according to the first embodiment, and the description thereof are appropriately omitted.

Figure 17:
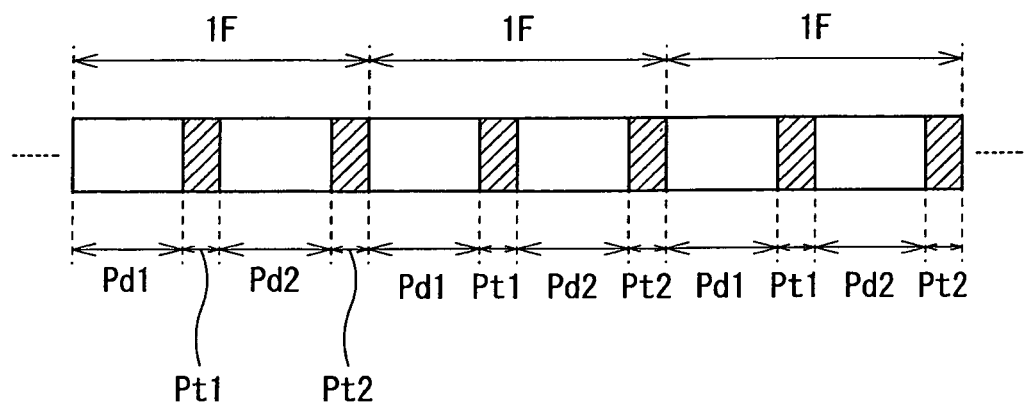
FIG. 17 is a schematic diagram illustrating a relationship between a display operation period and a touch detection operation period according to a second embodiment.

FIG. 17 illustrates arrangement of the touch detection operation period in one frame period (1F). The one frame period includes two display operation periods Pd1 and Pd2 and two touch detection operation periods Pt1 and Pt2, and these periods are arranged alternately like the display operation period Pd1, the touch detection operation period Pt1, the display operation period Pd2, and the touch detection operation period Pt2 on a timeline.

Figure 18:
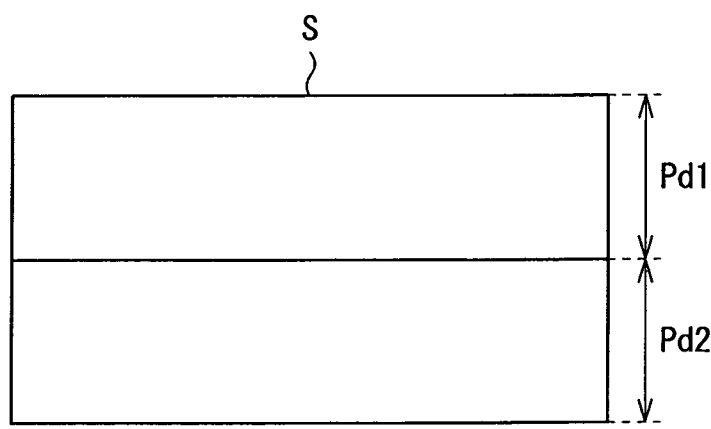
FIG. 18 is a schematic diagram for explaining the display operation period according to the second embodiment.

FIG. 18 illustrates display portions corresponding to the display operation periods Pd1 and Pd2 on the display surface/touch detection surface S. As illustrated in FIG. 18, in the example, the display device with a touch detection function 7 performs display operation on an upper half of the display surface/touch detection surface S in the display operation period Pd1, and performs display operation on a lower half thereof in the display operation period Pd2.

On the other hand, in the touch detection operation, for example, the touch detection is performed for one screen of the display surface/touch detection surface S in each of the touch detection operation periods Pt1 and Pt2. In other words, the display device with a touch detection function 7 performs the touch detection for one screen twice in each frame period with the display operation periods Pd1 and Pd2 in between. In such a manner, by increasing frequency of the touch detection for one screen, the touch detection is achievable more smoothly.

As described above, in the second embodiment, the display operation period for one screen is divided into a plurality of periods, and the touch detection operation is performed in the plurality of display operation periods. Therefore, the touch detection operation is achievable with high flexibility in timings.

Moreover, in the second embodiment, the touch detection for one screen is performed in each of the touch detection operation periods. Therefore, in the one frame period, the touch detection for one screen may be performed several times, and the touch detection is achievable more smoothly.

The other effects are the same as the case of the first embodiment.

[Modification 2-1]

Although in the above-described embodiment, the display operation period for one screen is divided into two periods (display operation periods Pd1 and Pd2), this is not limitative. Alternatively, the display operation period for one screen may be divided into three or more periods, for example.

[Modification 2-2]

Although in the above described-embodiment, the touch detection for one screen of the display surface/touch detection surface S is performed in each of the touch detection operation periods Pt1 and Pt2, this is not limitative. Alternatively, for example, the touch detection for one screen or more, or for a part of a screen may be performed.

4. Third Embodiment

Next, a display device with a touch detection function 8 according to a third embodiment of the disclosure will be described. In the above-described first embodiment and the like, the touch detection operation is performed only in the touch detection operation period. In contrast, in the third embodiment, the touch detection operation may be performed even in the display operation period. In other words, the display device with a touch detection function 8 is configured with use of a control section 17 controlling the operation to be performed at such timings. The other configurations are the same as in the above-described first embodiment (FIG. 1 and the like). Note that like numerals are used to designate substantially like components of the display device with a touch detection function 1 according to the first embodiment, and the description thereof are appropriately omitted.

Figure 19:
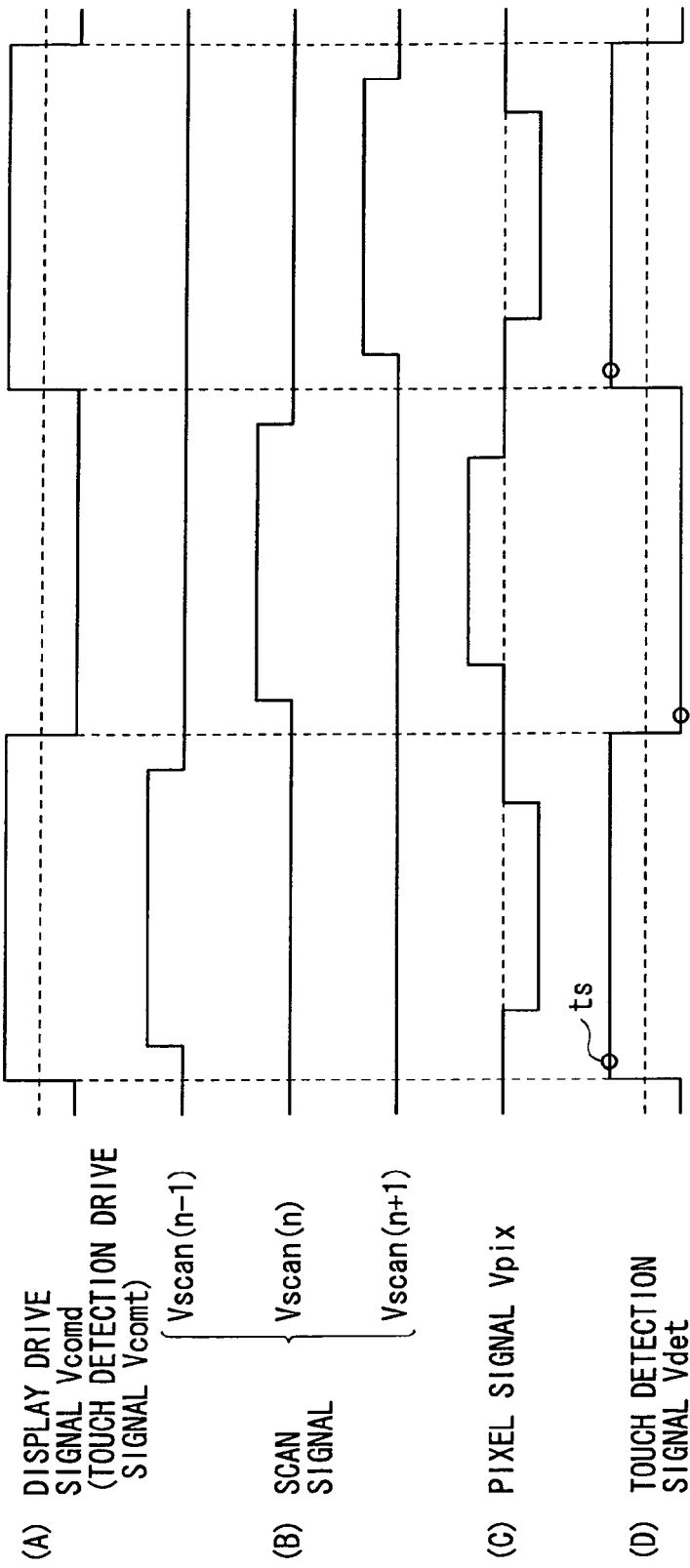
FIG. 19 is a timing waveform chart illustrating an operation example of a display operation period of a display device with a touch detection function according to a third embodiment.

FIG. 19 illustrates an example of timing waveforms of the display device with a touch detection function 8 in the display operation period Pd, where (A) illustrates a waveform of the display drive signal Vcomd, (B) illustrates waveforms of the scan signal Vscan, (C) illustrates a waveform of the pixel signal Vpix, and (D) illustrates a waveform of the touch detection signal Vdet. The display device with a touch detection function 8 applies the display drive signal Vcomd to each drive electrode block B, similarly to the above-described first embodiment.

The display device with a touch detection function 8 performs display operation ((A) to (C) of FIG. 19) in the same manner as the display device with a touch detection function 1 according to the first embodiment. At this time, the display drive signal Vcomd is transmitted to the touch detection electrodes TDL through the electrostatic capacitance to change the touch detection signal Vdet ((D) of FIG. 19). The A/D conversion section 43 A/D-converts the output signal of the analog LPF section 42 which has received the touch detection signal Vdet, at a sampling timing ts in synchronization with the display drive signal Vcomd ((D) of FIG. 19). In other words, the display device with a touch detection function 8 performs the touch detection operation not only in the touch detection operation period Pt but also in the display operation period Pd. At this time, the display device with a touch detection function 8 uses the display drive signal Vcomd in the touch detection operation, in addition to the display operation. In other words, the display drive signal Vcomd doubles as the touch detection drive signal Vcomt.

The sampling timing ts is desirably set in a period after transition of the display drive signal Vcomd (touch detection drive signal Vcomt) until the application of the pixel signal Vpix to the pixel signal line SGL. Therefore, for example, even in a case where the pixel signal Vpix is transmitted as noise to the touch detection electrodes TDL through the parasitic capacitance between the pixel signal line SGL and the touch detection electrodes TDL, the touch detection operation may be performed without being affected by the noise.

In such a way, the display device with a touch detection function 8 may perform the touch detection operation in the touch detection operation period Pt as illustrated in the first embodiment, and perform the display operation and the touch detection operation in the display operation period Pd as illustrated in FIG. 19. Therefore, for example, the display device with a touch detection function 8 may be switched so as to perform the touch detection operation in the display operation period Pd, to perform the touch detection operation in the touch detection operation period Pt, or to perform the touch detection operation in the display operation period Pd and the touch detection operation period Pt, depending on the situation.

As described above, in the embodiment, the touch detection operation is performed not only in the touch detection operation period Pt but also in the display operation period Pd. Therefore, the touch detection operation with high flexibility is achievable. The other effects are the same as in the case of the first embodiment.

[Modification 3-1]

Although in the above-described embodiment, as illustrated in the first embodiment, the drive electrodes COML are driven and scanned for each drive electrode block B, this is not limitative. Alternatively, for example, as illustrated in the modification of the first embodiment, a predetermined number of the drive electrodes COML are driven, and may be shifted one by one to perform scanning.

5. Application Examples

Next, application examples of the display device with a touch detection function described in the embodiments and modifications will be described with reference to FIG. 20 to FIG. 24G. The display device with a touch detection function of the above-described embodiments and the like is applicable to electronic units in any fields, such as a television, a digital camera, a notebook personal computer, a portable terminal device such as a mobile phone, and a video camera. In other words, the display device with a touch detection function of the above-described embodiments and the like is applicable to electronic units in various fields for displaying a picture signal input from outside or a picture signal internally generated as an image or a picture.

Application Example 1

Figure 20:
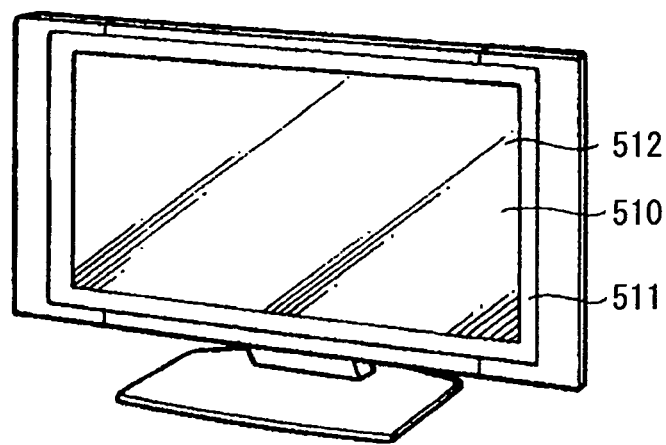
FIG. 20 is a perspective view illustrating an appearance configuration of an application example 1, out of display devices with a touch detection function applied with the embodiments.

FIG. 20 illustrates an appearance of a television to which the display device with a touch detection function of the above-described embodiments and the like is applied. The television has, for example, a picture display screen section 510 including a front panel 511 and a filter glass 512. The picture display screen section 510 is configured of the display device with a touch detection function according to the above-described embodiments and the like.

Application Example 2

Figure 21A:
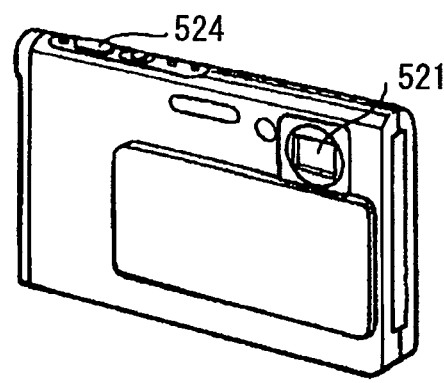
FIGS. 21A and 21B are perspective views illustrating an appearance configuration of an application example 2.
Figure 21B:
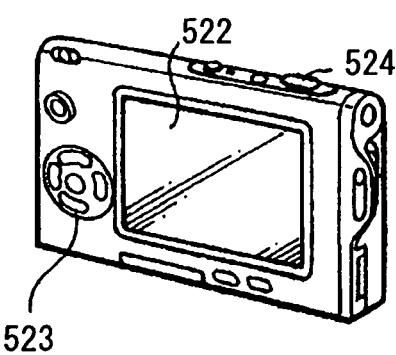

FIGS. 21A and 21B illustrate an appearance of a digital camera to which the display device with a touch detection function of the above-described embodiments and the like is applied. The digital camera has, for example, a light emitting section for a flash 512, a display section 522, a menu switch 523, and a shutter button 524. The display section 522 is configured of the display device with a touch detection function according to the above-described embodiments and the like.

Application Example 3

Figure 22:
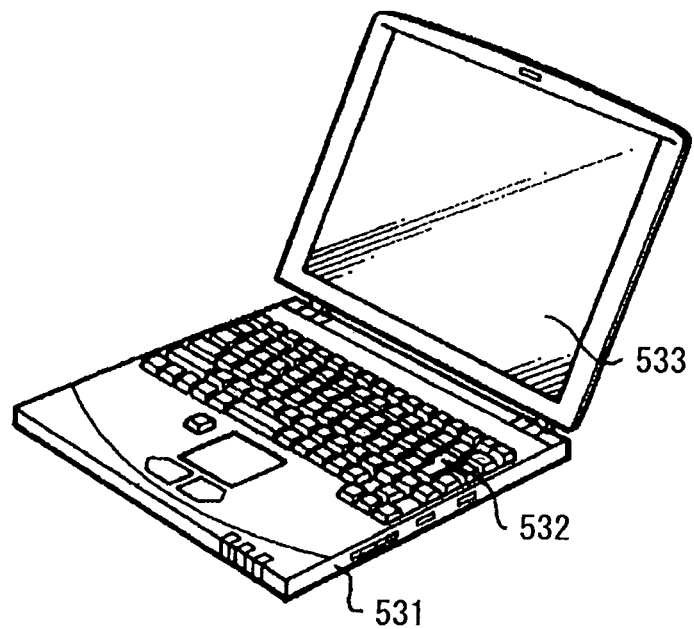
FIG. 22 is a perspective view illustrating an appearance configuration of an application example 3.

FIG. 22 illustrates an appearance of a notebook personal computer to which the display device with a touch detection function of the above-described embodiments and the like is applied. The notebook personal computer has, for example, a main body 531, a keyboard 532 for operation of inputting characters and the like, and a display section 533 for displaying an image. The display section 533 is configured of the display device with a touch detection function according to the above-described embodiments and the like.

Application Example 4

Figure 23:
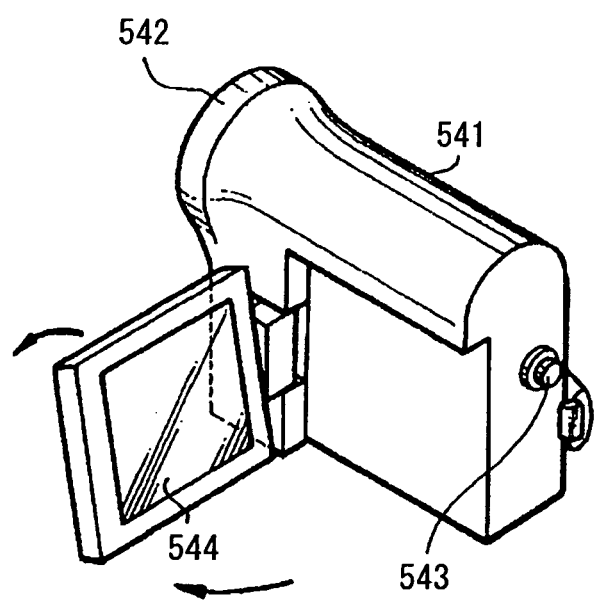
FIG. 23 is a perspective view illustrating an appearance configuration of an application example 4.
Figure 24:
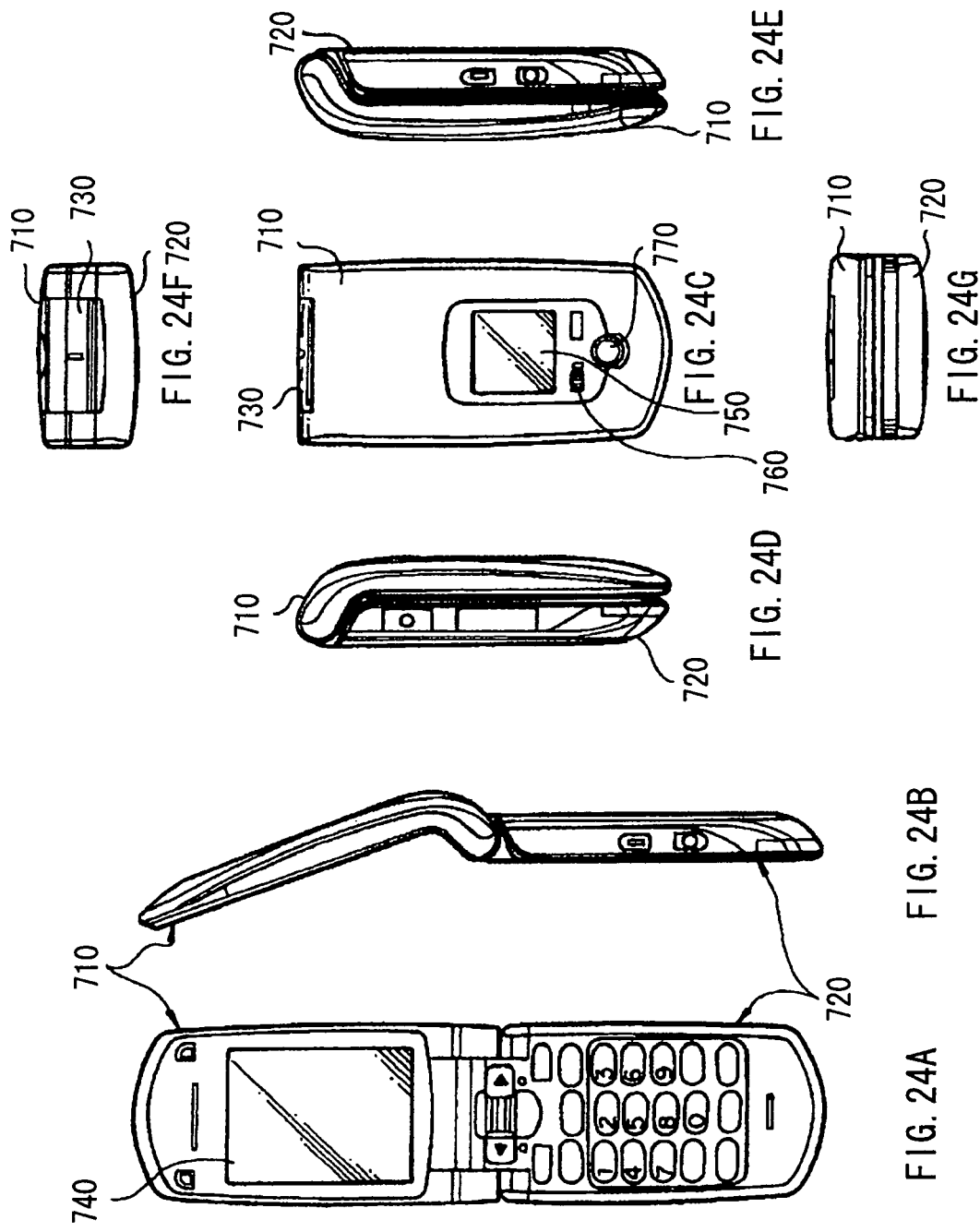
FIGS. 24A to 24G are front views, side views, a top view, and a bottom view illustrating an appearance configuration of an application example 5.

FIG. 23 illustrates an appearance of a video camera to which the display device with a touch detection function of the above-described embodiments and the like is applied. The video camera has, for example, a main body 541, a lens 542 for shooting an object provided on the front side face of the main body 541, a shooting start/stop switch 543, and a display section 544. Also, the display section 544 is configured of the display device with a touch detection function according to the above-described embodiments and the like.

Application Example 5

FIGS. 24A to 24G illustrate an appearance of a mobile phone to which the display device with a touch detection function of the above-described embodiments and the like is applied. In the mobile phone, for example, a top-side enclosure 710 and a bottom-side enclosure 720 are joined by a joint section (a hinge section) 730. The mobile phone has a display 740, a sub-display 750, a picture light 760, and a camera 770. The display 740 or the sub-display 750 is configured of the display device with a touch detection function according to the above-described embodiments and the like.

Hereinbefore, although the disclosure has been described with referring to the several embodiments, the modifications, and the application examples to the electronic units, the disclosure is not limited thereto, and various modifications may be made.

Figure 25:
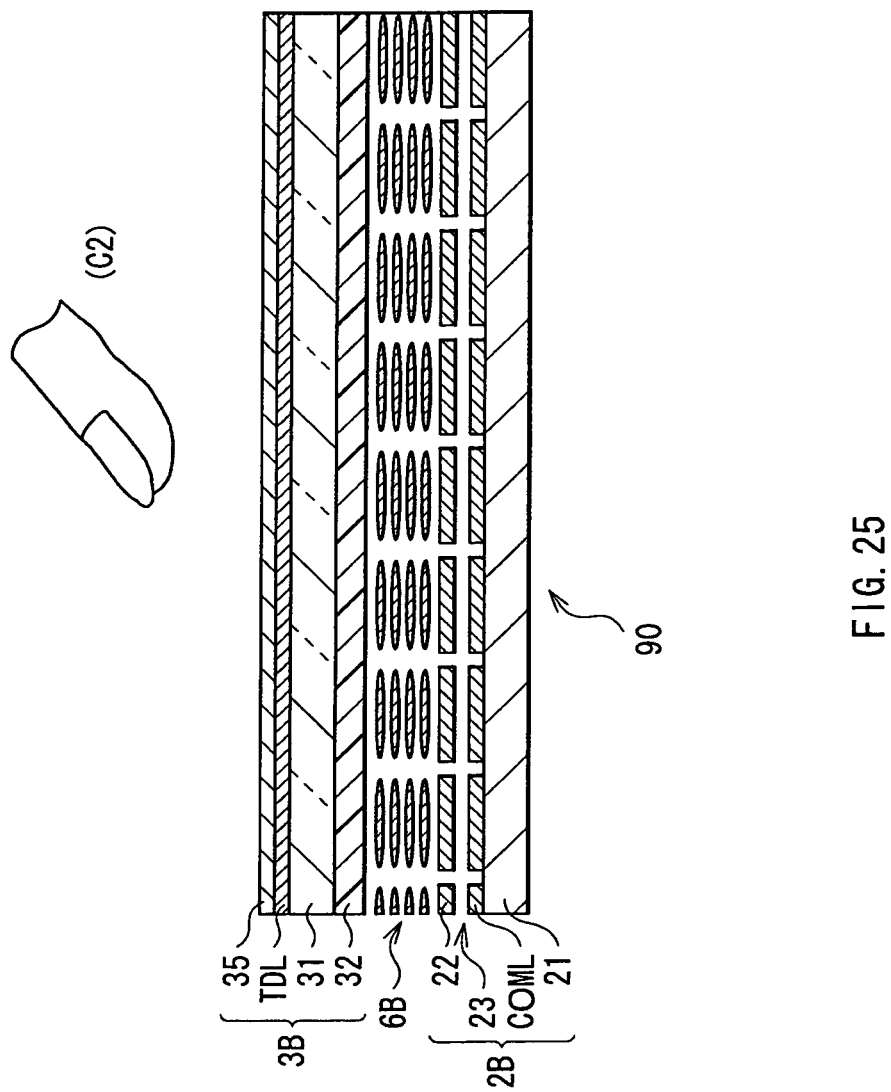

For example, in the above-described embodiments and the like, the display section with a touch detection function 10 is configured by integrating the touch detection section 30 and the liquid crystal display section 20 using a liquid crystal of various modes such as TN, VA, and ECB. Alternatively, the touch detection section may be integrated with a liquid crystal display section using a liquid crystal of lateral-electric-field mode such as FFS (fringe field switching) and IPS (in-plane switching). For example, in a case where a liquid crystal in the lateral-electric-field mode is used, a display section with a touch detection function 90 may be configured as illustrated in FIG. 25. FIG. 25 illustrates an example of a cross-sectional configuration of a relevant part in the display section with a touch detection function 90, and illustrates a state where a liquid crystal layer 6B is sandwiched between a pixel substrate 2B and a facing substrate 3B. Since names, functions, and the like of other parts are the same as in the case of FIG. 5, the description thereof is omitted. In the example, unlike the case of FIG. 5, the drive electrodes COML commonly used for display and for touch detection are formed directly on the TFT substrate 21, and configure a part of the pixel substrate 2B. The pixel electrodes 22 are arranged above the drive electrodes COML through the insulating layer 23. In this case, all dielectric bodies including the liquid crystal layer 6B, which are arranged between the drive electrodes COML and the touch detection electrodes TDL, contribute to the formation of the capacitance element C1.

For example, although in the above-described embodiments, the in-cell type display section with a touch detection function in which the liquid crystal display section and the electrostatic capacitance type touch detection section are integrated is used, this is not limitative. Alternatively, for example, the display section with a touch detection function may be configured by attaching an electrostatic capacitance type touch detection section to a liquid crystal display section. Also in this case, with the above-described configuration, touch detection is achievable while suppressing influence of external noise or noise transmitted from the liquid crystal display section (corresponding to the internal noise in the above-described embodiments).

The present application contains subject matter related to that disclosed in Japanese Priority Patent Application JP 2010-187221 filed in the Japan Patent Office on Aug. 24, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:

1. A display device with a touch detection function comprising:
    a plurality of display elements each performing display operation based on a pixel signal and a display drive signal;
    a touch detection element detecting an external proximity object based on a touch detection drive signal having a high frequency;
    a scan drive section performing display scanning by sequentially supplying the pixel signal and the display drive signal to the plurality of display elements in a time-divisional manner, and the scan drive section supplying the touch detection drive signal to the touch detection element; and
    a touch detection circuit detecting a touch detection signal by sampling at a sampling frequency a detection result from the touch detection element with a period shorter than a period of the display scanning, wherein
        the scan drive section supplies the touch detection drive signal to the touch detection element in a touch detection operation period different from a display operation period for performing the display scanning during each of a plurality of image frame periods,
        the scan drive section performs display scanning of each of the display elements sequentially at a sampling time in synchronization with the touch detection drive signal,
        each of the image frame periods includes a plurality of the display operation periods and a plurality of the touch detection operation periods,
        a plurality of the touch detections are respectively performed during the plurality of the touch detection operation periods and a plurality of the display operations are respectively performed during the plurality of the display operation periods, the touch detection signal is in synchronization with the touch detection drive signal, and the sampling frequency is an integral multiple of a frequency of the touch detection signal.

2. The display device with a touch detection function according to claim 1, wherein the display drive signal is a rectangular wave signal.

3. The display device with a touch detection function according to claim 1, wherein the display operation period is divided into plural periods by a period in which the display scanning is interrupted, and the touch detection operation period is provided within the period in which the display scanning is interrupted.

4. The display device with a touch detection function according to claim 3, wherein each of the plural periods corresponds to the display operation of the display elements within a respective display area.

5. The display device with a touch detection function according to claim 1, wherein the touch detection drive signal is a rectangular wave signal with a frequency higher than a frequency of the display drive signal, and the touch detection circuit samples the detection result from the touch detection element at timings in synchronization with the touch detection drive signal.

6. The display device with a touch detection function according to claim 1, wherein the touch detection element uses a change of an electrostatic capacitance based on proximity or contact of the external proximity object to detect the external proximity object.

7. The display device with a touch detection function according to claim 1, further comprising:

common drive electrodes arranged in parallel to extend in one direction, wherein the scan drive section applies the common drive electrodes with the display drive signal in the display operation period, and with the touch detection drive signal in the touch detection operation period.

8. The display device with a touch detection function according to claim 1, wherein the touch detection element detects the external proximity object based also on the display drive signal, and the touch detection circuit performs touch detection by sampling the detection result at timings in synchronization with the display drive signal also in the display operation period.

9. The display device according to claim 1, wherein the detection operation period corresponds to a blanking period of the display scanning.

10. A display device comprising:

a plurality of display elements;

a detection element; and a scan drive section performing display scanning by sequentially supplying a display drive signal to the plurality of display elements, and supplying a detection drive signal to the detection element, wherein the scan drive section supplies the detection drive signal to the detection element in a detection operation period different from a display operation period for performing the display scanning during each of a plurality of image frame periods, the scan drive section performs display scanning of each of the display elements sequentially at a sampling time in synchronization with the touch detection drive signal, each of the image frame periods includes a plurality of the display operation periods and a plurality of the touch detection operation periods, and a plurality of touch detections signals are respectively detected by sampling at a sampling frequency during the plurality of the touch detection operation periods and a plurality of the display operations are respectively performed during the plurality of the display operation periods, the touch detection signals are each in synchronization with the touch detection drive signal, and the sampling frequency is an integral multiple of a frequency of the touch detection signal.

11. The display device according to claim 10, wherein the detection operation period corresponds to a blanking period of the display scanning.

12. The display device according to claim 10, wherein the display operation period is divided into plural periods by a period in which the display scanning is interrupted, and the detection operation period is provided within a period in which the display scanning is interrupted.

13. A control circuit comprising:

a scan drive section performing display scanning by sequentially supplying a pixel signal and a display drive signal to a plurality of display elements in a time-divisional manner, and supplying a touch detection drive signal to a touch detection element detecting an external proximity object; and a touch detection circuit detecting a touch detection signal by sampling at a sampling frequency a detection result from the touch detection element with a period shorter than a period of the display scanning, wherein the scan drive section supplies the detection drive signal to the detection element in a detection operation period different from a display operation period for performing the display scanning during each of a plurality of image frame periods, the scan drive section performs display scanning of each of the display elements sequentially at a sampling time in synchronization with the touch detection drive signal, each of the image frame periods includes a plurality of the display operation periods and a plurality of the touch detection operation periods, a plurality of the touch detections are respectively performed during the plurality of the touch detection operation periods and a plurality of the display operations are respectively performed during the plurality of the display operation periods, the touch detection signal is in synchronization with the touch detection drive signal, and the sampling frequency is an integral multiple of a frequency of the touch detection signal.

14. A driving method of a display device with a touch detection function comprising:

performing display scanning by sequentially supplying a pixel signal and a display drive signal to a plurality of display elements in a display operation period, and supplying a touch detection drive signal to a touch detection element for detecting an external proximity object, in a touch detection operation period different from the display operation period for performing the display scanning during each of image frame periods; and driving the display device with a touch detection function to detect a touch detection signal by sampling with a sampling frequency a detection result from the touch detection element with a first period shorter than a second period of the display scanning, wherein the display scanning is performed for each of the plurality of display elements sequentially at a sampling time in synchronization with the touch detection drive signal, each of the image frame periods includes a plurality of the display operation periods and a plurality of the touch detection operation periods, a plurality of the touch detections are respectively performed during the plurality of the touch detection operation periods and a plurality of the display operations are respectively performed during the plurality of the display operation periods, the touch detection signal is in synchronization with the touch detection drive signal, and the sampling frequency is an integral multiple of a frequency of the touch detection signal.

15. An electronic unit including a display device with a touch detection function and a control section performing operation control with use of the display device with a touch detection function, the display device with a touch detection function comprising:

a plurality of display elements each performing display operation based on a pixel signal and a display drive signal;

a touch detection element detecting an external proximity object based on a touch detection drive signal having a high frequency;

a scan drive section performing display scanning by sequentially supplying the pixel signal and the display drive signal to the plurality of display elements in a time-divisional manner, and the scan drive section supplying the touch detection drive signal to the touch detection element; and a touch detection circuit detecting a touch detection signal by sampling at a sampling frequency a detection result of the touch detection element with a period shorter than a period of the display scanning, wherein the scan drive section supplies the detection drive signal to the detection element in a detection operation period different from a display operation period for performing the display scanning during each of a plurality of image frame periods, the scan drive section performs display scanning of each of the display elements sequentially at a sampling time in synchronization with the touch detection drive signal, each of the image frame periods includes a plurality of the display operation periods and a plurality of the touch detection operation periods, a plurality of the touch detections are respectively performed during the plurality of the touch detection operation periods and a plurality of the display operations are respectively performed during the plurality of the display operation periods, the touch detection signal is in synchronization with the touch detection drive signal, and the sampling frequency is an integral multiple of a frequency of the touch detection signal.

16. A display device with a touch detection function comprising:

a plurality of display elements each performing display operations based on a pixel signal and a display drive signal;

a touch detection element detecting an external proximity object based on a touch detection drive signal having a high frequency;

a scan drive section performing display scanning by sequentially supplying the pixel signal and the display drive signal to the plurality of display elements in a time-divisional manner, and the scan drive section supplying the touch detection drive signal to the touch detection element; and a touch detection circuit detecting a touch detection signal by sampling at a sampling frequency a detection result from the touch detection element with a period shorter than a period of the display scanning, wherein the scan drive section supplies the touch detection drive signal to the touch detection element in a touch detection operation period different from a display operation period for performing the display scanning during each of a plurality of image frame periods, the scan drive section performs display scanning of each of the display elements sequentially at a sampling time in synchronization with the touch detection drive signal, each of the image frame periods includes a plurality of the display operation periods and a plurality of the touch detection operation periods, a plurality of the touch detections are respectively performed during the plurality of the touch detection operation periods and a plurality of the display operations are respectively performed during the plurality of the display operation periods, the touch detection signal is in synchronization with the touch detection drive signal, and the sampling frequency is an integral multiple of a frequency of the touch detection signal.

* * * * *